United States Patent
Whelen

(10) Patent No.: US 11,758,354 B2
(45) Date of Patent: Sep. 12, 2023

(54) SYSTEM AND METHOD FOR INTENT-BASED GEOFENCING FOR EMERGENCY VEHICLE

(71) Applicant: WHELEN ENGINEERING COMPANY, INC., Chester, CT (US)

(72) Inventor: George Whelen, Old Saybrook, CT (US)

(73) Assignee: WHELEN ENGINEERING COMPANY, INC., Chester, CT (US)

(*) Notice: Subject to any disclaimer, the term of this patent is extended or adjusted under 35 U.S.C. 154(b) by 0 days.

(21) Appl. No.: 16/653,485

(22) Filed: Oct. 15, 2019

(65) Prior Publication Data

US 2021/0112368 A1    Apr. 15, 2021

(51) Int. Cl.
*H04W 4/021* (2018.01)
*G08G 1/0965* (2006.01)
*H04W 4/46* (2018.01)
*H04W 4/90* (2018.01)

(52) U.S. Cl.
CPC .......... *H04W 4/022* (2013.01); *G08G 1/0965* (2013.01); *H04W 4/46* (2018.02); *H04W 4/90* (2018.02)

(58) Field of Classification Search
CPC ....... H04W 4/021; H04W 4/022; H04W 4/90; H04W 4/46; G08G 1/0965
See application file for complete search history.

(56) References Cited

U.S. PATENT DOCUMENTS

| | | |
|---|---|---|
| 4,704,610 A | 11/1987 | Smith et al. |
| 6,028,514 A | 2/2000 | Lemelson et al. |
| 6,112,075 A | 8/2000 | Weiser |
| 6,516,273 B1 | 2/2003 | Pierowicz et al. |
| 6,700,504 B1 | 3/2004 | Aslandogan et al. |
| 6,895,332 B2 | 5/2005 | King et al. |
| 6,958,707 B1 | 10/2005 | Siegel |
| 7,046,160 B2 | 5/2006 | Pederson et al. |
| 7,085,637 B2 | 8/2006 | Breed et al. |
| 7,271,736 B2 | 9/2007 | Siegel et al. |
| 7,283,045 B1 | 10/2007 | Manz |
| 7,480,514 B2 | 1/2009 | Karaoguz et al. |
| 7,522,998 B2 | 4/2009 | Hughes |
| 7,663,504 B2 | 2/2010 | Votaw et al. |

(Continued)

FOREIGN PATENT DOCUMENTS

| | | |
|---|---|---|
| CA | 2215440 A1 | 3/1999 |
| CN | 104112348 A | 10/2014 |

(Continued)

OTHER PUBLICATIONS

Anzilotti, E., Can The Private Sector Help Cities Stop Traffic Deaths?, www.fastcompany.com, World Changing Ideas Newsletter, Jan. 2, 2018.

(Continued)

*Primary Examiner* — Benjamin H Elliott, IV
(74) *Attorney, Agent, or Firm* — HOGAN LOVELLS US LLP

(57) ABSTRACT

A system, method and storage medium for providing an emergency vehicle (EV) alert includes generating a geofence by varying a size or shape of the geofence according to a working mode of an EV and transmitting the generated geofence to another vehicle.

23 Claims, 18 Drawing Sheets

(56) References Cited

U.S. PATENT DOCUMENTS

| | | | |
|---|---|---|---|
| 7,868,783 B2 | 1/2011 | Bachelder | |
| 7,884,738 B2 | 2/2011 | Pappas et al. | |
| 7,899,621 B2 | 3/2011 | Breed et al. | |
| 8,094,040 B1 | 1/2012 | Cornett et al. | |
| 8,346,468 B2 | 1/2013 | Emanuel et al. | |
| 8,350,721 B2 | 1/2013 | Carr | |
| 8,471,701 B2 * | 6/2013 | Yariv | G01C 21/3679 340/539.13 |
| 8,487,780 B2 | 7/2013 | Edwardson | |
| 8,552,885 B2 | 10/2013 | Rijks | |
| 8,581,744 B2 | 11/2013 | Myler | |
| 8,593,301 B2 | 11/2013 | Newman | |
| 8,624,727 B2 | 1/2014 | Saigh et al. | |
| 8,712,429 B2 | 4/2014 | Nagorniak | |
| 8,723,680 B1 | 5/2014 | Baker | |
| 8,823,548 B2 | 9/2014 | Johnson et al. | |
| 8,842,021 B2 | 9/2014 | Behm et al. | |
| 8,928,492 B2 | 1/2015 | Boscacci | |
| 8,935,036 B1 | 1/2015 | Christensen et al. | |
| 8,963,705 B2 | 2/2015 | Miller et al. | |
| 9,053,637 B2 | 6/2015 | Mawbey et al. | |
| 9,254,781 B2 | 2/2016 | Applebaum | |
| 9,278,689 B1 | 3/2016 | Delp | |
| 9,380,144 B1 * | 6/2016 | Kritt | H04M 1/72406 |
| 9,412,273 B2 | 8/2016 | Ricci | |
| 9,547,986 B1 | 1/2017 | Curlander et al. | |
| 9,635,500 B1 | 4/2017 | Becker et al. | |
| 9,679,487 B1 * | 6/2017 | Hayward | G08G 1/162 |
| 9,738,217 B1 | 8/2017 | Bradley et al. | |
| 9,742,709 B1 | 8/2017 | Laich | |
| 9,756,668 B2 | 9/2017 | Farrell et al. | |
| 9,762,470 B2 | 9/2017 | Alam et al. | |
| 9,786,154 B1 | 10/2017 | Potter et al. | |
| 9,805,430 B2 | 10/2017 | Miasnik et al. | |
| 9,805,601 B1 | 10/2017 | Fields et al. | |
| 9,832,241 B1 * | 11/2017 | Hayward | G01S 19/51 |
| 9,841,767 B1 * | 12/2017 | Hayward | G05D 1/0285 |
| 9,843,913 B2 | 12/2017 | Dahan et al. | |
| 9,894,478 B1 | 2/2018 | DeLuca et al. | |
| 10,075,812 B1 * | 9/2018 | DeLuca | H04W 4/022 |
| 10,127,813 B2 | 11/2018 | Walsh et al. | |
| 10,410,516 B1 * | 9/2019 | Andersson | G06K 9/00825 |
| 10,531,224 B1 | 1/2020 | Lemieux | |
| 10,559,208 B1 | 2/2020 | McAlpine et al. | |
| 10,635,720 B1 * | 4/2020 | Luo | G06F 16/909 |
| 10,689,815 B2 | 6/2020 | Sheckler et al. | |
| 2003/0137415 A1 | 7/2003 | Thomson | |
| 2003/0141990 A1 | 7/2003 | Coon | |
| 2003/0169181 A1 | 9/2003 | Taylor | |
| 2004/0246144 A1 | 12/2004 | Siegel et al. | |
| 2004/0263355 A1 | 12/2004 | Carroll | |
| 2005/0104745 A1 | 5/2005 | Bachelder et al. | |
| 2006/0009234 A1 | 1/2006 | Freer | |
| 2006/0030984 A1 | 2/2006 | Kamiya | |
| 2007/0132608 A1 | 6/2007 | Votaw et al. | |
| 2007/0132609 A1 | 6/2007 | Stackelhouse | |
| 2007/0159354 A1 | 7/2007 | Rosenberg | |
| 2008/0088434 A1 | 4/2008 | Frieder et al. | |
| 2008/0125970 A1 | 5/2008 | Scheckler | |
| 2009/0299625 A1 | 12/2009 | Denaro | |
| 2011/0018736 A1 | 1/2011 | Carr | |
| 2011/0053553 A1 * | 3/2011 | Lambert | H04W 16/00 455/404.2 |
| 2011/0068949 A1 | 3/2011 | Ieda et al. | |
| 2011/0115623 A1 * | 5/2011 | Gnanasekaran | G08B 25/016 340/539.26 |
| 2011/0178811 A1 | 7/2011 | Sheridan | |
| 2011/0187559 A1 | 8/2011 | Applebaum | |
| 2011/0256881 A1 | 10/2011 | Huang et al. | |
| 2012/0259537 A1 | 10/2012 | Schmidt et al. | |
| 2012/0313792 A1 | 12/2012 | Behm et al. | |
| 2013/0027221 A1 | 1/2013 | Johnson et al. | |
| 2013/0090843 A1 | 4/2013 | Funabashi | |
| 2013/0105583 A1 | 5/2013 | Peterson et al. | |
| 2013/0110292 A1 | 5/2013 | Peterson et al. | |
| 2013/0110357 A1 | 5/2013 | Peterson et al. | |
| 2013/0173474 A1 | 7/2013 | Ranganathan et al. | |
| 2013/0295970 A1 | 11/2013 | Sheshadri et al. | |
| 2013/0326137 A1 | 12/2013 | Bilange et al. | |
| 2014/0121932 A1 | 5/2014 | Zeng | |
| 2014/0210643 A1 | 7/2014 | Baker | |
| 2014/0354449 A1 | 12/2014 | Alam et al. | |
| 2015/0148060 A1 * | 5/2015 | Parab | H04W 4/021 455/456.1 |
| 2015/0237193 A1 * | 8/2015 | Zeilingold | H04L 63/107 455/418 |
| 2015/0288819 A1 | 10/2015 | Brown et al. | |
| 2016/0042767 A1 | 2/2016 | Araya et al. | |
| 2016/0063773 A1 | 3/2016 | Hatton et al. | |
| 2016/0065658 A1 * | 3/2016 | Alon | G06Q 10/063116 709/204 |
| 2016/0071412 A1 | 3/2016 | Bullock et al. | |
| 2016/0071417 A1 | 3/2016 | Lewis et al. | |
| 2016/0078576 A1 * | 3/2016 | Su | G08G 1/127 705/7.12 |
| 2016/0100302 A1 | 4/2016 | Barash et al. | |
| 2016/0154117 A1 | 6/2016 | Baudia | |
| 2016/0171521 A1 | 6/2016 | Ramirez et al. | |
| 2016/0210858 A1 * | 7/2016 | Foster | G08G 1/0965 |
| 2017/0015239 A1 | 1/2017 | Rao et al. | |
| 2017/0039784 A1 * | 2/2017 | Gelbart | G07C 5/0808 |
| 2017/0098372 A1 | 4/2017 | Eilertsen | |
| 2017/0098373 A1 * | 4/2017 | Filley | G08G 1/096708 |
| 2017/0105108 A1 * | 4/2017 | South | G08B 27/006 |
| 2017/0187787 A1 | 6/2017 | Syamala et al. | |
| 2017/0192429 A1 | 7/2017 | Tseng et al. | |
| 2017/0193821 A1 | 7/2017 | Baranga et al. | |
| 2017/0219360 A1 | 8/2017 | Cui et al. | |
| 2017/0241660 A1 | 8/2017 | Sekar et al. | |
| 2017/0259832 A1 * | 9/2017 | Lathrop | G01C 21/3697 |
| 2017/0332347 A1 | 11/2017 | Boss et al. | |
| 2017/0353892 A1 | 12/2017 | Elia et al. | |
| 2017/0359712 A1 | 12/2017 | Meredith et al. | |
| 2017/0366930 A1 | 12/2017 | Treman | |
| 2018/0005523 A1 | 1/2018 | Cahan et al. | |
| 2018/0059669 A1 | 3/2018 | Madigan et al. | |
| 2018/0087914 A1 | 3/2018 | Bravo et al. | |
| 2018/0090000 A1 | 3/2018 | Bravo et al. | |
| 2018/0121956 A1 | 5/2018 | DeLuca et al. | |
| 2018/0204447 A1 | 7/2018 | Morgan et al. | |
| 2018/0232767 A1 | 8/2018 | Garg et al. | |
| 2018/0288232 A1 * | 10/2018 | MacNeille | H04W 4/023 |
| 2018/0322785 A1 | 11/2018 | Jerichow et al. | |
| 2019/0019297 A1 | 1/2019 | Lim et al. | |
| 2019/0027032 A1 | 1/2019 | Arunachalam | |
| 2019/0035269 A1 | 1/2019 | Donovan et al. | |
| 2019/0082377 A1 | 3/2019 | Silver | |
| 2019/0088106 A1 | 3/2019 | Grundstrom | |
| 2019/0088140 A1 | 3/2019 | Sheckler et al. | |
| 2019/0101930 A1 | 4/2019 | Yadmellat | |
| 2019/0149417 A1 * | 5/2019 | Augusto Lopes | H04L 41/0886 370/254 |
| 2019/0220001 A1 | 7/2019 | Lavoie et al. | |
| 2019/0342739 A1 * | 11/2019 | Shah | G01C 21/3492 |
| 2019/0357032 A1 * | 11/2019 | South | G08B 27/006 |
| 2019/0364381 A1 * | 11/2019 | Weston | H04W 4/021 |
| 2020/0028745 A1 * | 1/2020 | Parkvall | H04L 41/0233 |
| 2020/0135005 A1 * | 4/2020 | Katz | G06F 3/0486 |
| 2020/0159968 A1 * | 5/2020 | Pasternak | H04W 52/146 |
| 2020/0168080 A1 * | 5/2020 | Kim | B60W 30/18 |
| 2020/0221250 A1 * | 7/2020 | Whelen | H04W 4/44 |
| 2020/0314623 A1 * | 10/2020 | Pellegrini | H04W 76/15 |
| 2020/0329334 A1 * | 10/2020 | Kurian | H04W 60/00 |
| 2020/0346751 A1 * | 11/2020 | Horelik | A61N 1/3904 |
| 2021/0112368 A1 * | 4/2021 | Whelen | G08G 1/0965 |
| 2021/0268881 A1 * | 9/2021 | Kobel | B60J 5/0497 |

FOREIGN PATENT DOCUMENTS

| | | |
|---|---|---|
| CN | 105857277 A | 8/2016 |
| CN | 105894857 A | 8/2016 |
| DE | 102013008545 A1 | 11/2014 |
| DE | 102016005114 A1 | 2/2017 |

(56) References Cited

FOREIGN PATENT DOCUMENTS

| | | |
|---|---|---|
| EP | 2325822 A1 | 5/2011 |
| FR | 3046771 A1 | 7/2017 |
| JP | 2009198391 A | 9/2009 |
| JP | 2014201181 A | 10/2014 |
| KR | 1020160092965 A | 8/2016 |
| WO | 2006034246 A2 | 3/2006 |
| WO | 2015136958 A1 | 9/2015 |
| WO | 2017082756 A1 | 5/2017 |
| WO | 2017200754 A1 | 5/2017 |
| WO | 2017200794 A1 | 11/2017 |

OTHER PUBLICATIONS

2018 GovTech 100, Next Wave of Civic Innovation, http://www.govtech.com/100/, Jan. 22, 2018.
HAAS AlertR2V™ (Responder-to-Vehicle) Technology: Enabling Safer, Faster, Emergency Response, HAAS Inc., 2018.
PCT International Search Report and Written Opinion dated Aug. 27, 2018 from corresponding Application No. PCT/US18/37297, 17 pages.
International Search Report and Written Opinion; Application No. PCT/US2019/012817; dated Oct. 9, 2019.
PCT International Search Report and Written Opinion of the International Searching Authority dated Oct. 8, 2019 in corresponding Application No. PCT/US2019/021604, 15 pages.
International Search Report and Written Opinion issued in PCT/US2018/063210 dated Mar. 7, 2019.

* cited by examiner

| Mode | G(x) |
|---|---|
| 1410_1 Emergency Mode | $G_{E\_1}(x)$ |
| 1410_2 Emergency Mode | $G_{E\_2}(x)$ |
| ... | ... |
| 1410_M Emergency Mode | $G_{E\_M}(x)$ |

FIG. 6A

| Intent | Mode | G(x) |
|---|---|---|
| 1420_1 — Intent | 1410_1 — Emergency Mode | $G_{E\_1}(x)$ |
| 1420_2 — Intent | 1410_2 — Emergency Mode | $G_{E\_2}(x)$ |
| ... | ... | ... |
| 1420_N — Intent | 1410_K — Emergency Mode | $G_K(x)$ |

FIG. 7

| Statuses of EV | Intents |
|---|---|
| Mobile | Chasing or pursuing of criminals ~ 8010 |
| | Emergency responding ~ 8020 |
| | Transferring patients ~ 8030 |
| | . . . |
| Immobile | Safety actions for stopped vehicles ~ 8060 |
| | Extinguishing fire ~ 8070 |
| | Rescue operations ~ 8080 |
| | . . . |

FIG. 8A

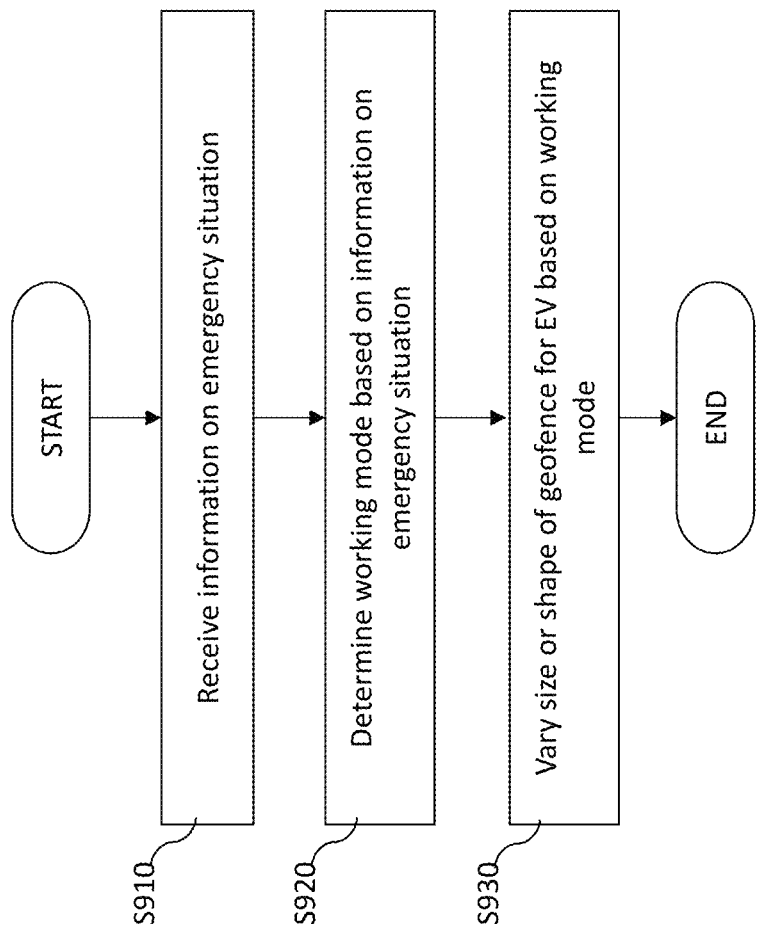

SYSTEM AND METHOD FOR INTENT-BASED GEOFENCING FOR EMERGENCY VEHICLE

TECHNICAL FIELD

This application relates to a system or method for effectively providing an emergency vehicle alert to other vehicles by dynamically configuring a size, shape and direction of a geofence for the emergency vehicle according to an intent of the emergency vehicle operator to assist the emergency vehicle to safely pass the other vehicles and to prevent vehicle or officer strikes from behind when stopped on a roadside.

BACKGROUND

When emergency situations such as disasters, car accidents, crimes, etc. take place, it is not only critical to send emergency responders to emergency scenes promptly and efficiently to provide rescue efforts to the people involved in the emergency event, but it is also important to guarantee the safety of emergency vehicles (EVs) responding to the emergency scene.

Widely used means to guarantee the safety of EVs includes providing direct emergency vehicle alerts based on conventional audio or visual signaling devices such as flashing lights, sirens and/or horns. However, these conventional signaling devices may not be adequate, or may provide unnecessary alerts to vehicles which are not even on roads that the EV can travel. These alerts may also easily be ignored by people, or go unnoticed by people with hearing impairments or by distracted drivers.

However, no prior work has been made on determining an appropriate size or shape of the EV geofence in consideration of an intent with which the EV is operated.

SUMMARY OF THE INVENTION

Aspects of the present disclosure are a system, method and storage medium for providing an emergency vehicle alert to other vehicles by dynamically configuring a size or shape of a geofence for the emergency vehicle according to an intent of the emergency vehicle operator.

According to one aspect, there is provided a system for providing an emergency vehicle (EV) alert. The system includes a processor and a transmitter. The processor is configured to generate a geofence for an EV by varying a size or shape of the geofence depending on a working mode of the EV. The transmitter is configured to transmit the generated geofence.

In one embodiment, the system may include the another vehicle. Another processor associated with the another vehicle may be configured to receive the geofence, determine a location of the another vehicle with respect to the geofence, and perform one or more alert actions based on the determined location of the another vehicle with respect to the received geofence.

In one embodiment, the processor may further be configured to determine the working mode of the EV based on a selection input by an operator or program instructions stored in memory and executable by the processor. The program instructions, when executed by the processor, may determine the working mode based on information on an emergency situation received over a communication network.

In one embodiment, the working mode may include a normal mode and one or more emergency modes.

In one embodiment, the system may include an input interface configured to receive the selection input corresponding to one of the normal mode and the emergency modes and transmit the selection input to the processor.

In one embodiment, the processor may further be configured to increase the size of the geofence when the working mode is changed from the normal mode to one of the emergency modes.

In one embodiment, the processor may further be configured to vary the size or shape of the geofence when the working mode is changed between the emergency modes.

In one embodiment, the processor may further be configured to increase the size of the geofence when the working mode is changed from one of the emergency modes having a first degree of emergency to another of the emergency modes having a second degree of emergency higher than the first degree of emergency.

In one embodiment, the input interface may include one or more selection menus associated with the emergency modes.

In one embodiment, the processor and the memory storing the program instructions may be implemented using a machine learning system.

In one embodiment, the processor and the transmitter may be in the vicinity of or included in the EV.

In one embodiment, the processor and the transmitter may be in the vicinity of or included in a management server remotely located from the EV.

According to another aspect of the present disclosure, there is provided a method for providing an emergency vehicle (EV) alert. The method includes generating, by a processor, a geofence by varying a size or shape of the geofence depending on a working mode of an EV; and transmitting, by a transmitter, the generated geofence.

According to still another aspect of the present disclosure, there is provided a computer-readable storage medium having computer readable program instructions. The computer readable program instructions are read and executed by at least one processor for performing a method for providing an emergency vehicle. The method includes generating a geofence by varying a size or shape of the geofence depending on a working mode of an EV and transmitting the generated geofence.

BRIEF DESCRIPTION OF THE DRAWINGS

The present disclosure will become more readily apparent from the specific description accompanied by the drawings.

FIG. 6A depicts an example mapping relationship among emergency modes and geofence functions according to an exemplary embodiment of the present disclosure;

FIG. 7 depicts an example mapping relationship among intents, emergency modes, and geofence functions according to an exemplary embodiment of the present disclosure;

FIG. 8A depicts example classifications of the intents depending on a moving status of the EV according to an exemplary embodiment of the present application;

FIG. 9B depicts a flow chart of a method for selecting a working mode of an EV and varying a size or shape of a geofence based on the selected working mode according to an exemplary embodiment of the present disclosure.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "emergency vehicle (EV)" includes, but are not limited: a police vehicle, an ambulance, a fire truck, etc.

The term "geofence" of an emergency vehicle (EV) is defined as a boundary of a safety alert zone where other one or more vehicles in the vicinity of the EV are alerted to the presence of the EV. Thus, it can be appreciated that a zone encompassed by the geofence can be a safety alert zone. Further, "geofencing" for an EV can be understood as generating the safety alert zone for the EV.

Figure 1:
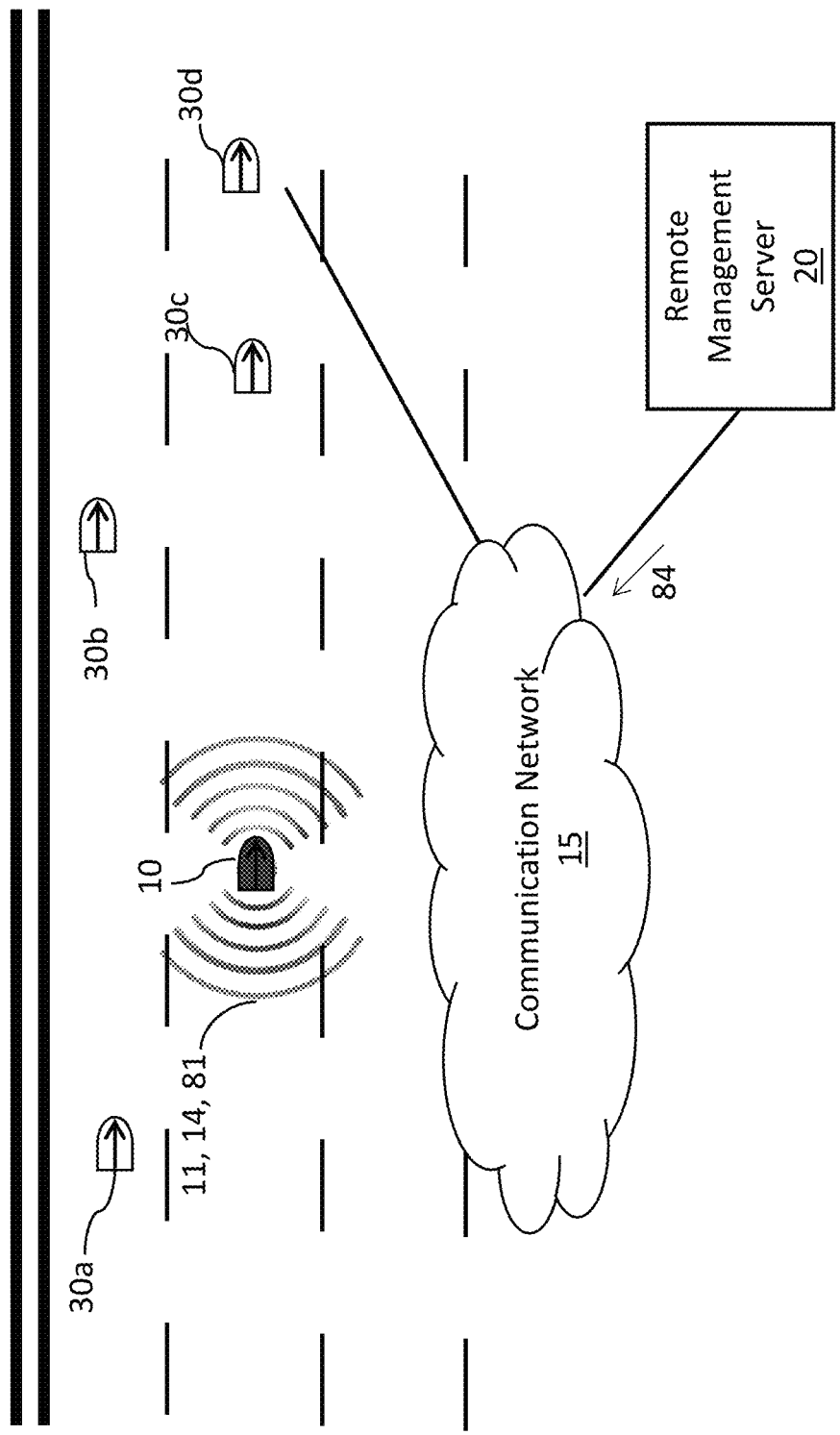
FIG. 1 depicts an example environment where an EV alert management network is operated according to an exemplary embodiment of the present disclosure.

FIG. 1 depicts an example environment where an EV alert management network is operated according to an exemplary embodiment of the present disclosure.

Referring now to FIG. 1, an EV 10 communicates with a remote management server 20 through a communication network 15. In one embodiment, the EV 10 may transmit EV-related data 11, a working mode selection signal 14 and/or the like to the remote management server 20. The remote management server 20 may communicate with each of other vehicles 30a to 30d which travel on roads nearby the EV 10 with a geofence. In some embodiments, the EV 10 may directly communicate with the vehicles 30a to 30d by transmitting a geofence. The communication network 15 may be implemented using a wireless communication technique based on radio-frequency identification (RFID), code division multiple access (CDMA), global system for mobile communication (GSM), wideband CDMA, CDMA2000®, time division multiple access (TDMA), long term evolution (LTE), FirstNet, wireless LAN, Bluetooth®, or the like.

For example, in order to ensure the EV 10's safety during traveling over the road, a geofence (e.g., 81 of FIG. 2A or 84 of FIG. 2B) can be generated by the remote management server 20 or the EV 10. The geofence refers to a safety zone of the EV 10 which allows the EV to traverse the traffic safely. Example embodiments regarding generating and transmitting of the geofence of an emergency vehicle are disclosed in Applicant's copending U.S. patent application Ser. No. 16/243,692 filed on Jan. 9, 2019, entitled "SYSTEM AND METHOD FOR VELOCITY-BASED GEOFENCING FOR EMERGENCY VEHICLE", the entire disclosure of which is incorporated by reference herein. As disclosed in the U.S. patent application Ser. No. 16/243,692, a remote management server may generate a geofence based on EV-related data which are transmitted from the EV 10 and a size or shape of the geofence for an EV is varied based on a velocity of an EV.

Similarly, in one embodiment of the present disclosure, the remote management server 20 may generate a geofence (e.g., 84) based on the EV-related data transmitted from the EV 10 and transmit the geofence 84 to the vehicles 30a to 30d. The EV-related data 11 include a location of the vehicle, a velocity of the vehicle, and an ID of the EV 10.

However, in some embodiments, the EV 10 may generate a geofence (e.g., 81) based on the EV-related data and transmit the geofence to the other vehicles 30a to 30d. Hereinafter, the present disclosure will primarily describe embodiments where the geofence is generated and transmitted by the remote management server 20 only for the sake of description. However, exemplary embodiments of the present disclosure are not limited thereto. Substantially the same or similar description given for the embodiments where the geofence is generated and transmitted by the remote management server 20 will be applied to the embodiments where the geofence is generated and transmitted by the EV 10. Duplicate thereof will be omitted for the sake of simplicity.

In addition, compared to the above-mentioned Applicant's U.S. patent application Ser. No. 16/243,692, the present disclosure discloses embodiments where a size or shape of a geofence for the EV 10 is varied depending on a working mode of the EV 10. The term "working mode" of the EV 10 refers to a mode in which the EV 10 is operated in association with a specific intent. In other words, the term "intent" may be understood as an emergency action or mission to which the EV 10 is assigned to take in regard to an emergency situation or event.

Figure 2A:
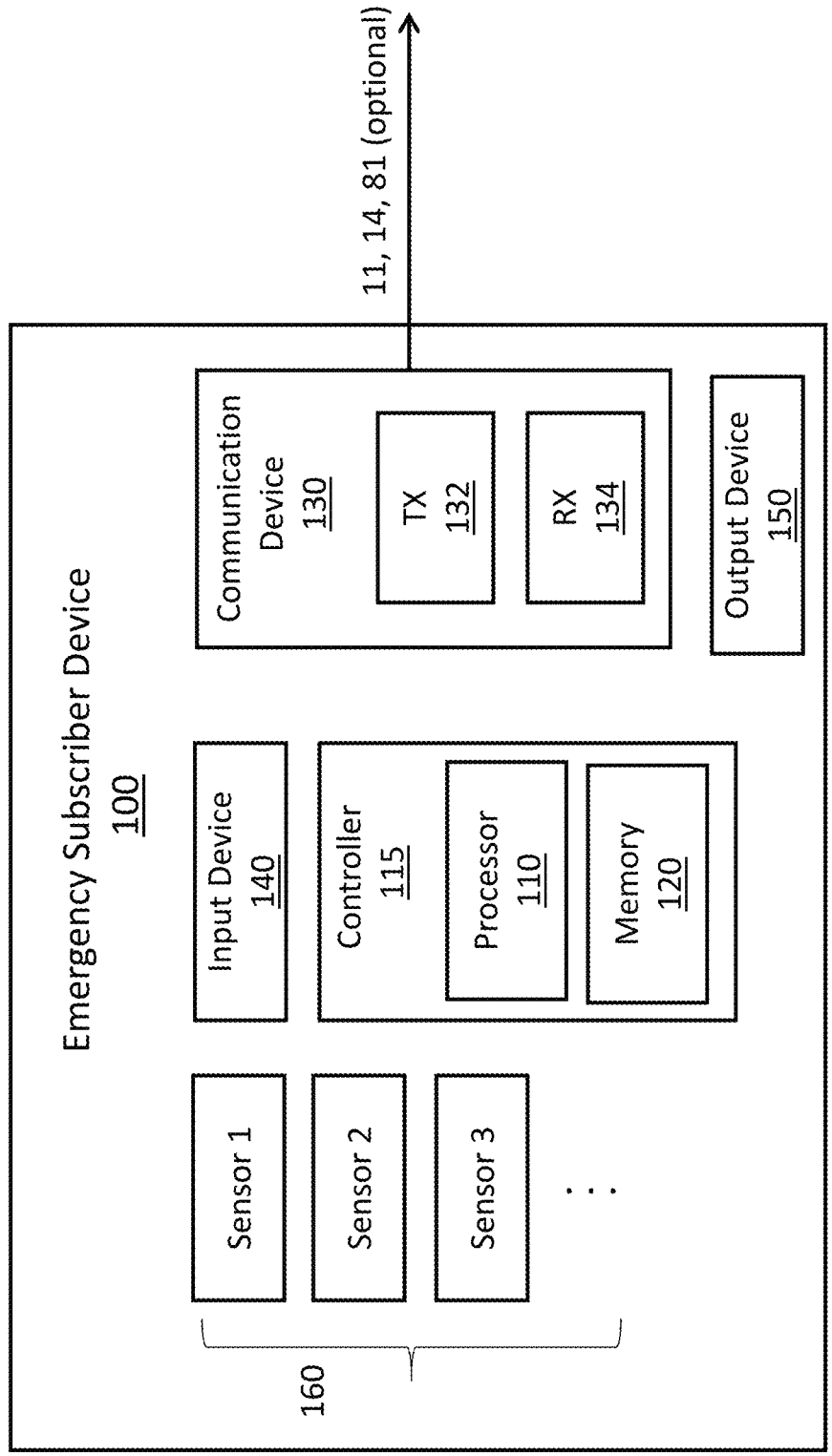
FIG. 2A depicts a block diagram of an emergency subscriber device according to an exemplary embodiment of the present disclosure.
Figure 2B:
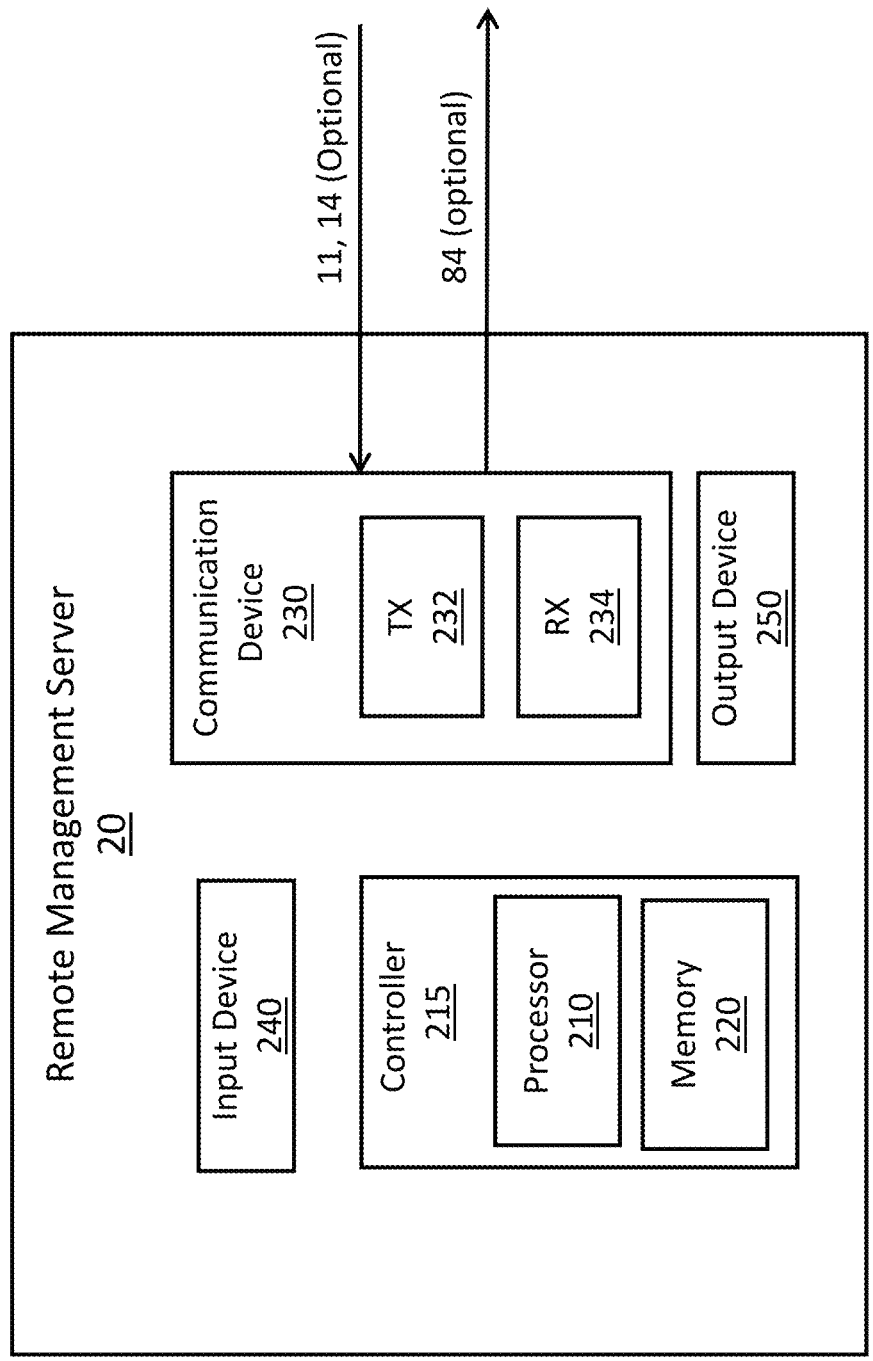
FIG. 2B depicts a block diagram of a remote management server according to an exemplary embodiment of the present disclosure.
Figure 2C:
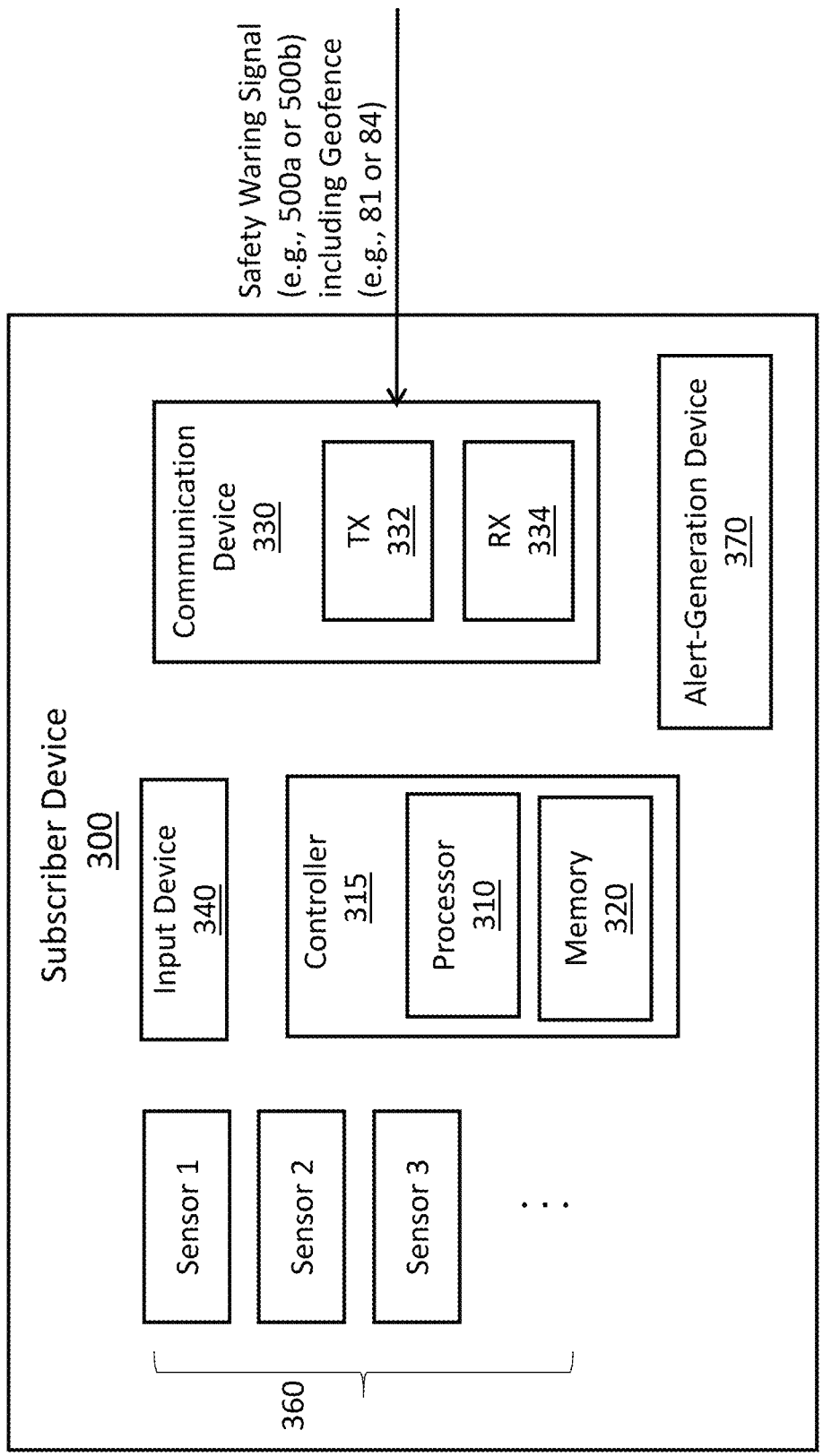
FIG. 2C depicts a block diagram of a subscriber device receiving an EV alert from the remote management server according to an exemplary embodiment of the present disclosure.

FIG. 2A depicts a block diagram of an emergency subscriber device 100 according to an exemplary embodiment of the present disclosure. FIG. 2B depicts a block diagram of a remote management server 20 according to an exemplary embodiment of the present disclosure. FIG. 2C depicts a block diagram of a subscriber device 300 receiving an EV alert from the remote management server 20 according to an exemplary embodiment of the present disclosure.

In one embodiment, the emergency subscriber device 100 can be installed as a part of the EV 10, a wearable or portable device attached to the EV 10, or in the vicinity thereof. Similarly, in one embodiment, the subscriber device 300 can be installed as a part of each vehicle 30*a* to 30*d*, attached to the vehicle, or in the vicinity thereof.

Embodiments Where Geofence is Generated and Transmitted by Remote Management Server In this section will be described the embodiments where the geofence (e.g., 84) is generated and transmitted by the remote management server 20.

As shown in FIG. 2A, the emergency subscriber device 100 includes a controller 115, a communication device 130, an input device 140, an output device 150, and one or more sensor devices 160. The controller 115 includes a processor 110 and a memory 120. As shown in FIG. 2B, the remote management server 20 includes a controller 215, a communication device 230, an input device 240, and an output device 250. The controller 215 includes a processor 210 and a memory 220. The remote management server 20 may reside on a network infrastructure or on a third-party service provider, such as a cloud storage and computing system. Further, referring to FIG. 2C, the subscriber device 300 includes a controller 315, a communication device 330, an input device 340, and an alert-generation device 370. The controller 315 includes a processor 310 and a memory 320. Each vehicle 30*a* to 30*d* may be a vehicle registered for services that provide emergency vehicle alerts, so that at least one of the above components thereof is designed to have features to receive the emergency vehicle alerts.

Referring to FIG. 2A, the emergency subscriber device 100 generates EV-related data 11 and/or a working mode selection signal 14 and transmit the EV-related data 11 and/or the working mode selection signal 14 to the remote management server 20. The EV-related data 11 includes a type of the EV, a location of the EV, a velocity of the EV, or the like. The working mode selection signal 14 includes a working mode of the EV 10 which is selected (or determined). More details of the working mode selection signal 14 will be described with reference to FIGS. 4A and 4B.

Referring further to FIG. 2B, the remote management server 20 receives the EV-related data 11 and/or the working mode selection signal 14 using a receiver 234 of the communication device 230 transmitted over the communication network 15 and store the EV-related data 11 and/or the working mode selection signal 14 into the memory 220. The communication device 230 includes a transmitter 232 and the receiver 234. The communication device 230 may be implemented to support at least one of the above-mentioned communication techniques such as RFID, CDMA, GSM, wideband CDMA, CDMA2000®, TDMA, LTE, wireless LAN, Bluetooth®, or the like. The input device 240 can be, but is not limited to: a keyboard, a touch screen, an audio input system, a voice recognition system, or the like. The output device 250 can be, but is not limited to: a screen, a speaker, a light, a siren, a visual system, an audio system, or the like.

The remote management server 20 can perform one or more safety actions to provide an alert of the EV 10 to other vehicles 30*a* to 30*d* traveling on roads nearby the EV 10. The safety actions may include: determining a geofence based on the EV-related data 11, generating a safety warning signal (e.g., 500*a* of FIG. 3A or 500*b* of FIG. 3B) based on the determined geofence; and transmitting the safety warning signal to the other vehicles 30*a* to 30*d* nearby the EV 10, more details of which will be described later.

Figure 3A:
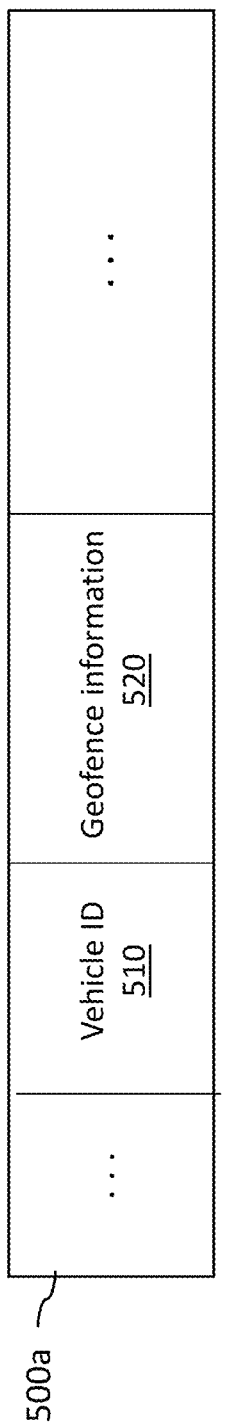
FIG. 3A depicts an example safety warning signal generated by a remote management server and transmitted to a subscriber device of each of other vehicles according to an exemplary embodiment of the present disclosure.

In one embodiment, referring to FIG. 3A, illustrated is an example safety warning signal 500*a* generated by the processor 210 of the remote management server 20 and transmitted to the subscriber device 300 of each vehicle 30*a* to 30*d*. The safety warning signal 500*a* includes, but is not limited to: an EV ID 510 and geofence information 520 related to the EV ID 510. The geofence information 520 can be any information used for identifying directly or indirectly features (e.g., size or shape) of the geofence for the EV 10. For example, the geofence information 520 may be understood as a geofence, and thus, the geofence (e.g., 81, 84) is a part of the safety warning signal (e.g., 500*a* or 500*b*).

Figure 3B:
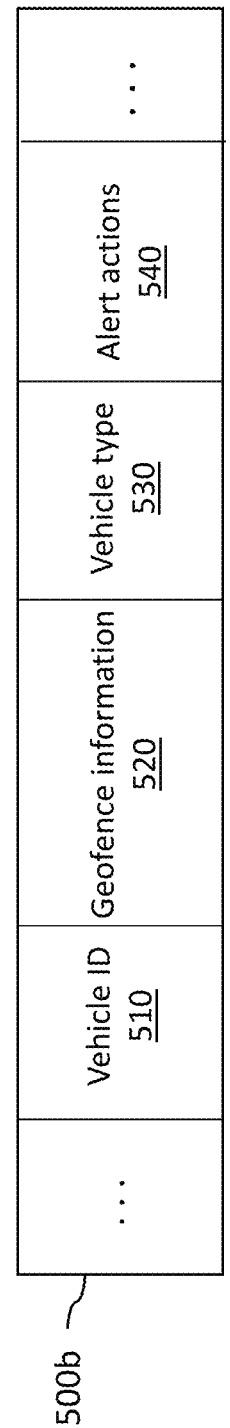
FIG. 3B depicts an example safety warning signal generated by a remote management server and transmitted to a subscriber device of each of other vehicles according to an exemplary embodiment of the present disclosure.

Referring to FIG. 3B, illustrated is another example safety warning signal 500*b* that further includes an EV type 510 and one or more alert actions 540 for each vehicle 30*a* to 30*d* to follow when a certain condition is met. The certain condition may include that a current location of each vehicle 30*a* to 30*d* is matched to a geofence defined by the geofence information.

In one embodiment, the geofence information 520 is directly provided as a set of location coordinates corresponding to a boundary of the determined geofence.

In another embodiment, the geofence information 520 is indirectly provided as an indication (e.g., geofence function G(x)) that can be used by the subscriber device 300 to retrieve the geofence from the geofence information 520, more details of which will be described with reference to FIG. 2C. When the geofence information 520 is indirectly provided as an indication that can be used by the subscriber device 300, a current location of the EV 10 may be provided in the safety warning signal 500*a* and/or safety warning signal 500*b*, so that the subscriber device 300 can combine the EV current location to generate a more exact geofence defined around the EV 10, and/or the subscriber device 300 tracks of the EV 10's movement based on the EV current location and displays on a visual system thereof. By way of example, the indication can be an index identifying a specific geofence, and information regarding relationships between the indices and their respective mapping geofences can be prestored in the memory 320 of the subscriber device 300, so that the subscriber device 300 can read out an appropriate geofence based on the index.

In some examples, the safety warning signal 500*a* or 500*b* is transmitted to the subscriber device 300 of each vehicle 30*a* to 30*d*, and the processor 310 of the subscriber device 300 processes the geofence information 520 in the safety warning signal 500a or 500b to display the geofence through a display of the alert-generation device 370 of the subscriber device 300.

Referring back to FIG. 2A, the sensor devices 160 collects the EV-related data 11. For example, the sensor data can be collected using sensor devices 160 including, but are not limited to: an accelerometer, a global positioning system (GPS) receiver, a velocity sensor, a motion sensor, infrared light sensors, radar, laser radar, cameras, a gyroscope, or the like. The collected EV-related data 11 may be stored in the memory 120 or other storage (not shown).

In addition, the memory 120 includes program instructions executable by the processor 110 to perform functions or operations of the emergency subscriber device 100 described in the present disclosure. The processor 110 reads the stored data which have been collected from the sensor devices 160 and processes to generate messages that will be transmitted to the remote management server 20 through the transmitter 132 of the communication device 130.

The communication device 130 may be implemented to support at least one of the above-mentioned communication techniques.

The input device 140 can be, but is not limited to: a keyboard, a touch screen, an audio input system, a voice recognition system, or the like. The output device 150 can be, but is not limited to: a screen, a speaker, a light, a siren, a visual system, an audio system, or the like.

Referring back to FIG. 2C, the communication device 330 includes a transmitter 332 and a receiver 334 which are implemented to support at least one of the above-mentioned communication techniques being capable of communicating with the communication device 230 of the remote management server 20 and/or the communication device 130 of the EV 10.

The safety warning signal 500a or 500b received through the receiver 334 may be stored in the memory 320. The processor 310 may retrieve a geofence for the EV 10 based on the safety warning signal 500a or 500b.

In one embodiment, if the geofence information 520 is provided as a set of location coordinates corresponding to a boundary of the determined geofence, the processor 310 of the subscriber device 300 determines whether a current location of the corresponding vehicle is matched to the geofence of the EV 10 based on the set of location coordinates in the geofence information 520. For example, if the current location of each vehicle 30a to 30d is within the boundary defined by the set of location coordinates, the processor 310 determines a match between the vehicle current location and the geofence; otherwise, it determines a mismatch therebetween. If the match is found between the current location and the geofence, the processor 310 controls the alert-generation device 370 to perform one or more alert actions; otherwise (e.g., if no match is found therebetween), the processor 310 discards the safety warning signal 500a or 500b and performs no further action for providing the EV alert.

In one embodiment, if the geofence information 520 is provided as an indication for geofence (e.g., geofence function G(x)) as discussed above, the processor 310 further retrieves the geofence based on the geofence information 520 (e.g., based on the geofence function G(x)), and then determines whether the vehicle current location is located within the geofence or not. If a match is found between the current location and the geofence, the processor 310 controls the alert-generation device 370 to perform one or more alert actions; otherwise (e.g., if no match is found therebetween) the processor 310 discards the safety warning signal 500a or 500b and performs no further action for providing the EV alert.

In one embodiment, the alert-generation device 370 is configured to perform alert actions under control of the processor 310. The alert-generation device 370 can be, but is not limited to: a screen, a speaker, a light, a siren, a visual system, an audio system, or the like. The input device 340 can be, but is not limited to: a keyboard, a touch screen, an audio input system, a voice recognition system, or the like. The current location can be collected using the sensor devices 360 such as a positioning device, as shown in FIG. 2C.

In one embodiment, the alert actions include generating a visual and/or audible warning signal for a driver to recognize an EV alert for next safety actions such as yielding for the EV to let the EV safely pass.

In one embodiment, the alert actions are preprogrammed and stored in the memory 320 of the subscriber device 300, and when a match is found between the current location and the geofence, the processor 310 reads the alert actions from the memory 320 to control the alert-generation device 370 to perform the alert actions.

In one embodiment, the alert actions are transferred from the remote management server 20 to the subscriber device 300 of each vehicle 30a to 30d through the alert action information field 520 in the safety warning signal 500b, as depicted in FIG. 3B. In this case, the processor 310 controls the alert-generation device 370 to perform the alert actions, as instructed in the alert action information field 540.

In one embodiment, the geofence can dynamically be adjusted in size or shape according to a working mode of the EV 10. For example, when determining the geofence for the EV 10, the processor 210 of the remote management server 20 dynamically changes the shape or size of the geofence based on the working mode of the EV 10. The working mode of the EV 10 can be selected (or determined) at the EV 10 or the remote management server 20. In case the working mode is selected at the EV 10, the selected working mode is provided in the working mode selection signal 14 and transmitted to the remote management server 20 over the communication network 15.

The working mode includes a normal mode and one or more emergency modes. When the EV 10 is in a normal mode, it may be understood that the EV 10 does not perform any mission associated with the emergency situation; in this case, no geofence may be generated, or a geofence of a minimum size (e.g., $G_N(x)$) may be generated. When the EV 10 is in an emergency mode, it may be understood that the EV 10 performs emergency actions(s) (with an intent) associated with the emergency situation. In addition, when the working mode of the EV 10 is changed from the normal mode to an emergency mode, a geofence having a larger size than the geofence $G_N(x)$ is generated and transmitted, so that the EV 10 can travel more safely.

In case of two or more emergency modes, the emergency modes may have different degrees of emergencies one from another, and different sizes or shapes of geofences may be generated and transmitted for the respectively emergency modes having different degrees of emergencies. For example, as the working mode is changed from an emergency mode having the lowest degree of emergency to an emergency mode having the highest degree of emergency, the size of a corresponding geofence to be generated and transmitted is increased accordingly, or vice versa.

In one embodiment, the working mode of the EV 10 can be selected (or determined) in a manual manner by a user selection input through an input device 140 of the emergency subscriber device 100, which will be described with reference to FIG. 4A.

When an emergency situation takes place, information on the emergency situation may be collected by one or more network devices (not shown) and shared with the remote management server 20 and the EV 10 through the communication network 15. If the EV 10 receives the information on the emergency situation, it may transmit the same to the emergency subscriber device 100 of the EV 10. Examples of the information on the emergency situation, but are not limited: a location or time where the emergency situation has occurred, a content (e.g., car accident, fire, natural disaster, robbery, etc.) of the emergency situation, the number of deaths or injuries, or the like.

Figure 4A:
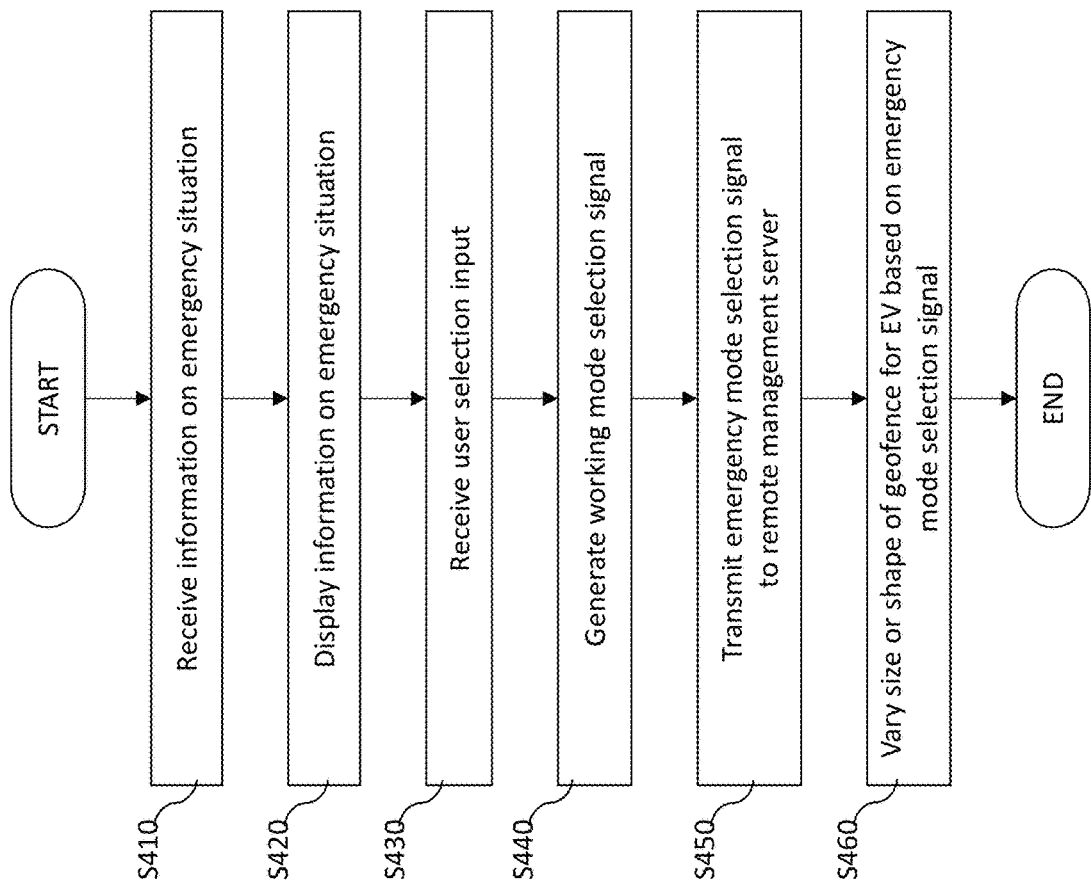
FIG. 4A depicts a flow chart of a method for selecting a working mode of an EV and varying a size or shape of a geofence based on the selected working mode according to an exemplary embodiment of the present disclosure.

FIG. 4A depicts a flow chart of a method for selecting a working mode of an EV and varying a size or shape of a geofence based on the selected working mode according to an exemplary embodiment of the present disclosure.

Referring to FIG. 4A, the working mode selection of the EV 10 is made in a manual manner by a user selection input through the input device 140 of the emergency subscriber device 100. In step S410, the emergency subscriber device 100 (e.g., processor 110) receives the information on the emergency situation from the remote management server 20 or other control systems which receive various information regarding emergency situations such as accidents, crimes, disasters, or the like. Next, the emergency subscriber device 100 may display an operator of the EV (e.g., driver) the information of the emergency situation using the output device 150 (e.g., display screen) (S420) and allow the EV operator to select (or input) one of emergency modes through the input device 140. Thus, the emergency subscriber device 100 receives a user selection input for the working mode of the EV 10 (S430).

Figure 5:
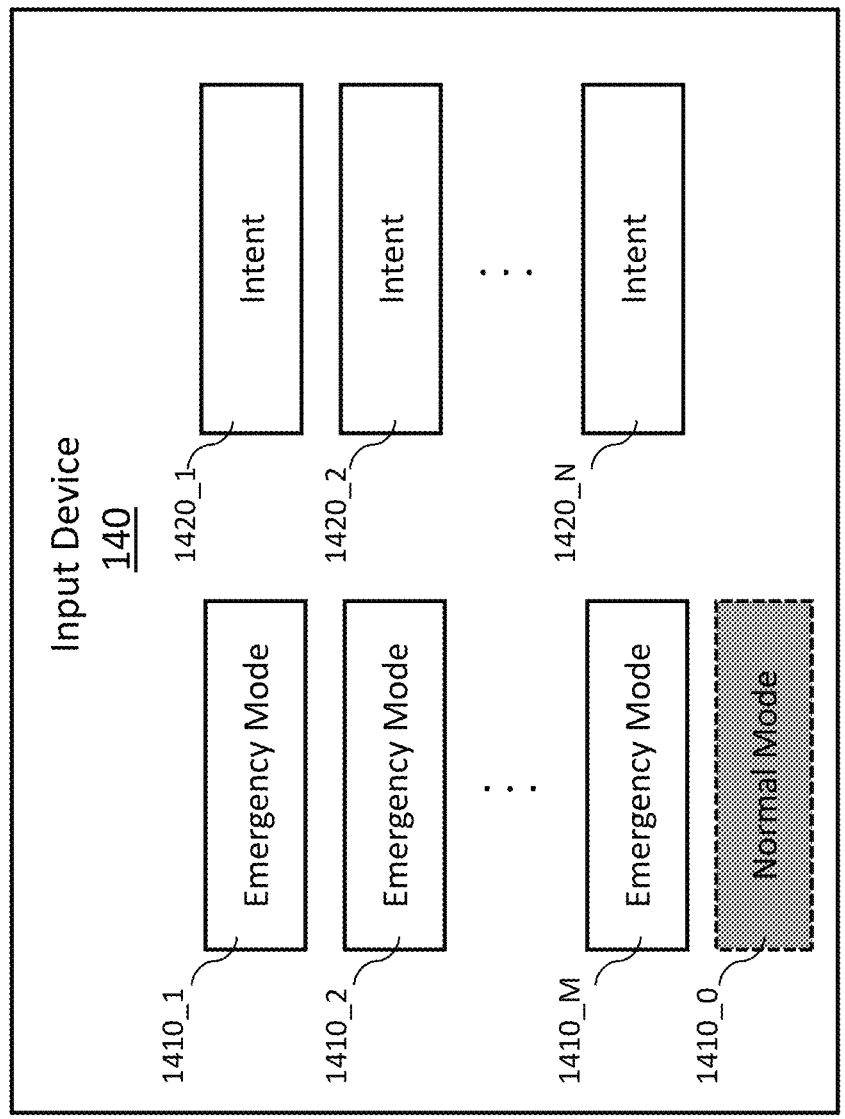
FIG. 5 depicts an example selection menu of an input device according to an exemplary embodiment of the present disclosure.

An example of selection menu for the working mode is depicted in FIG. 5. For example, the selection menu may include a specific button, or the like which allows the user to select a working mode in which he wants to operate the EV 10. The selection menu may include, but are not limited: a normal mode 1410_0, one or more emergency modes 1410_1 to 1410_M and/or one or more intents 1420_1 to 1420_N. Here, M and N are integers each equal to or more than one. Upon selecting one of the menu by a user (e.g., an operator of the EV 10), the emergency subscriber device 100 (e.g., processor 110) generates a working mode selection signal 14 that indicates the working mode corresponding to the selected menu (S440) and transmits the working mode selection signal 14 to the remote management server 20 using the transmitter 132 (S450). Next, the remote management server 20 (e.g., processor 210) varies a size or shape of a geofence for the EV 10 based on the working mode provided in the working mode selection signal 14, when it determines the geofence (S460).

Upon selecting the normal node 1410_0, the working mode selection signal 14 indicating that the EV 10 is in the normal mode is transmitted to the remote management server 20, and the processor 210 of the remote management server 20 determines a geofence (e.g., $G_N(x)$), generates a safety warning signal based on the geofence $G_N(x)$, and transmits the safety warning signal to the other vehicles 30a to 30d nearby the EV 10. In some aspects, in the normal mode, no geofence may be generated. In further aspects, the selection menu of the input device 140 of FIG. 2A might not include the normal mode, so it may be conceivable that the normal mode is set as a default mode if none of the emergency modes 1410_1 to 1410_M and intents 1420_1 to 1420_N is selected.

In addition, the operator of the EV may determine a degree of emergency for an emergency situation based on the information of the emergency situation displayed on the output device 150 and select an emergency mode (among the emergency modes 1410_1 to 1410_M) corresponding to the determined degree of emergency.

Upon selecting a particular emergency mode of the emergency modes 1410_1 to 1410_M, the working mode selection signal 14 indicating that the EV 10 is in the particular emergency mode is transmitted to the remote management server 20, and the processor 210 of the remote management server 20 determines a geofence corresponding to the particular emergency mode, generates a safety warning signal based on the geofence, and transmits the safety warning signal to the other vehicles 30a to 30d nearby the EV 10.

Figure 6B:
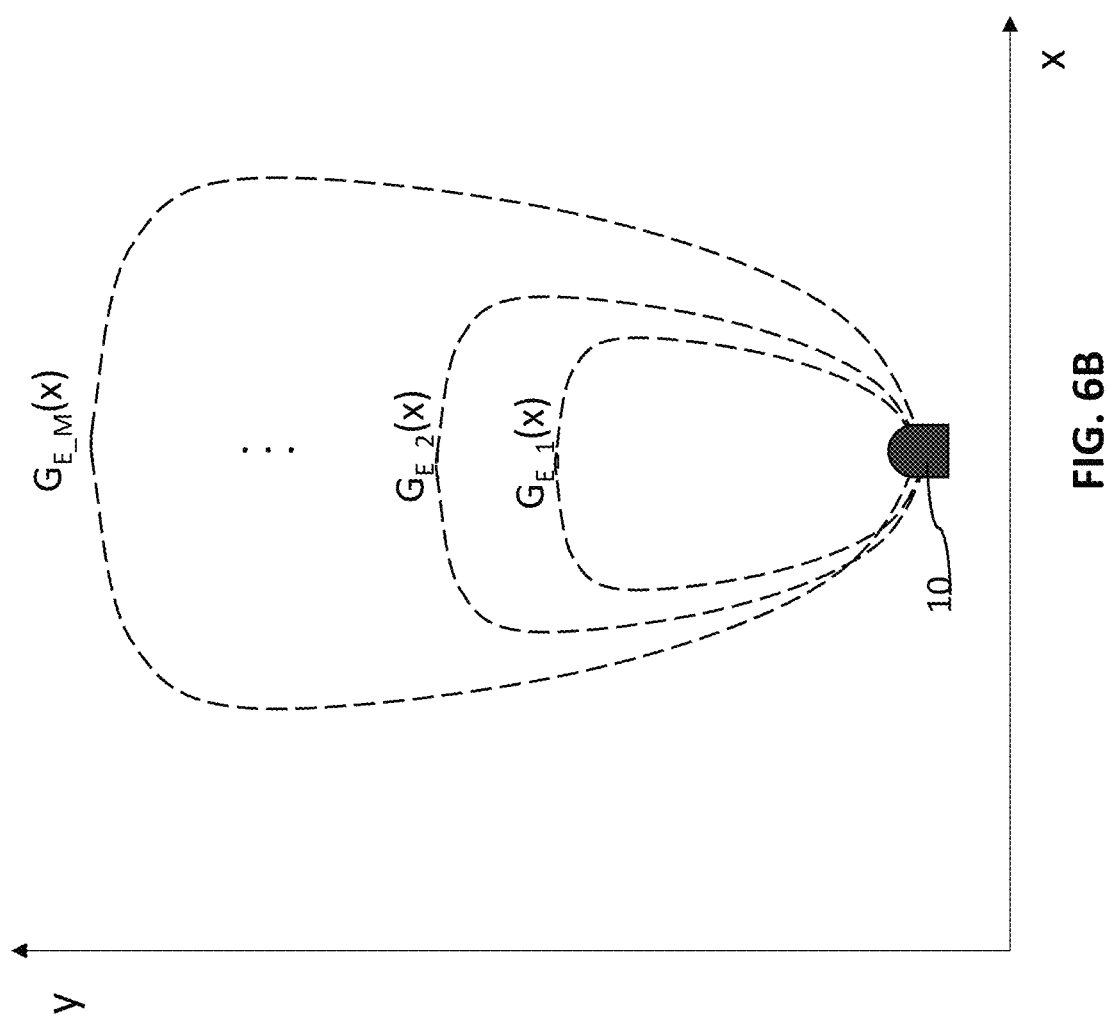
FIG. 6B depicts example geofence functions of FIG. 6A according to an exemplary embodiment of the present disclosure.

FIG. 6A depicts an example mapping relationship among multiple emergency modes, and geofence functions according to an exemplary embodiment of the present disclosure. FIG. 6B depicts example geofence functions of FIG. 6A according to an exemplary embodiment of the present disclosure.

Referring now to FIGS. 6A and 6B, the emergency modes 1410_1 to 1410_M have different degrees of emergencies one from another which are respectively mapped to different geofence functions $G_{E\_1}(x)$ to $G_{E\_M}(x)$. For example, as the working mode is changed from the emergency mode 1410_1 to the emergency mode 1410_M, the degree of emergency increases, and thus, the size of corresponding geofence is increased from the geofence $G_{E\_1}(x)$ to $G_{E\_M}(x)$. as shown in FIG. 6B. Although it is illustrated in FIG. 6B that shapes of the geofences are similar to one to another, exemplary embodiments of the present disclosure are not limited thereto. For example, the shapes thereof can be varied if necessary.

In addition, referring back to FIG. 5, the EV operator may directly determine and select a particular intent from among the intents 1420_1 to 1420_N based on the information of the emergency situation displayed on the output device 150.

FIG. 7 depicts an example mapping relationship among intents, emergency modes, and geofence functions according to an exemplary embodiment of the present disclosure. As exemplary depicted in FIG. 7, for example, a certain intent (e.g., 1420_1) is associated with one (e.g., 1410_1) of the emergency modes 1410_1 to 1410_M, so that upon selecting such intent (e.g., 1420_1), the working mode selection signal 14 indicating that the EV 10 is in the emergency mode (e.g., 1410_1) is transmitted to the remote management server 20, and the processor 210 of the remote management server 20 determines a geofence corresponding to the emergency mode (e.g., 1410_1), generates a safety warning signal based on the geofence, and transmits the safety warning signal to the other vehicles 30a to 30d nearby the EV 10. As a further example, another intent (e.g., 1420_N) is not associated with any of the emergency modes 1410_1 to 1410_M. In this case, upon selecting the intent (e.g., 1420_N), the working mode selection signal 14 indicating that the EV 10 is in an emergency mode (e.g., 1410_K) corresponding to the intent (e.g., 1420_N) is transmitted to the remote management server 20, and the processor 210 of the remote management server 20 determines a geofence (e.g., $G_K(x)$) corresponding to the emergency mode (e.g., 1410_K), generates a safety warning signal based on the geofence, and transmits the safety warning signal to the other vehicles 30a to 30d nearby the EV 10. The emergency mode 1410_K might not be among the emergency modes 1410_1 to 1410_M, for example, no degree of emergency might be assigned to the emergency mode 1410_K unlike the emergency modes 1410_1 to 1410_M, and a corresponding geofence $G_K(x)$ might have a different size or shape from each of the geofences $G_{E\_1}(x)$ to $G_{E\_M}(x)$.

Although it is illustrated in FIG. 5 that the selection menu includes both the emergency modes 1410_1 to 1410_M and the intents 1420_1 to 1420_N, exemplary embodiments of the present disclosure are not limited thereto. In some examples, the system allows only one group of the emergency modes 1410_1 to 1410_M and the intents 1420_1 to 1420_N to be used for the working mode selection of the EV 10, so that either of the emergency modes 1410_1 to 1410_M and the intents 1420_1 to 1420_N might not be shown or provided in the selection menu of FIG. 5.

In one embodiment, the working mode of the EV 10 can be selected (or determined) in an automatic manner by the emergency subscriber device 100 of the EV 10, which will be described with reference to FIG. 4B.

Figure 4B:
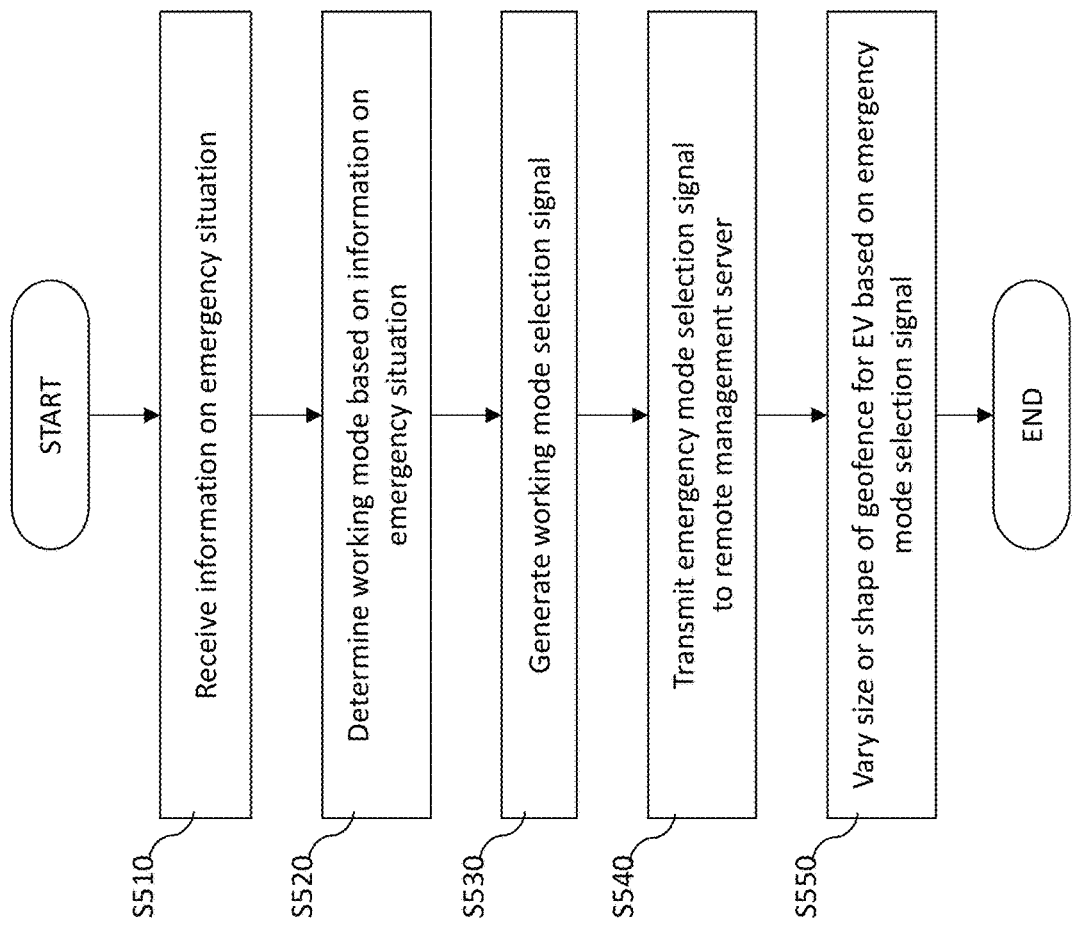
FIG. 4B depicts a flow chart of a method for selecting a working mode of an EV and varying a size or shape of a geofence based on the selected working mode according to an exemplary embodiment of the present disclosure.

FIG. 4B depicts a flow chart of a method for selecting a working mode of an EV and varying a size or shape of a geofence based on the selected working mode according to an exemplary embodiment of the present disclosure.

Referring to FIG. 4B, the working mode selection of the EV 10 is made in an automatic manner by the emergency subscriber device 100 (e.g., the processor 110) based on the information on the emergency situation. In step S510, the processor 110 receives the information on the emergency situation from the remote management server 20 or other control systems which receive various information regarding emergency situations. Next, the processor 110 determines a working mode based on the information of the emergency situation (S520), generates a working mode selection signal 14 indicating the determined working mode (S530), and transmits the working mode selection signal 14 to the remote management server 20 using the transmitter 132 (S540). Next, the remote management server 20 (e.g., processor 210) varies a size or shape of a geofence for the EV 10 based on the working mode provided in the working mode selection signal 14, when it determines the geofence.

In some aspects, the memory 120 stores information on a mapping relationship (not shown) between the information of the emergency situation and a desired working mode in which the EV 10 is expected to work. The processor 110 uses the mapping relationship to determine the working mode based on the information of the emergency situation.

In another aspects, the processor 110 and the memory 120 may be implemented using a machine learning system (e.g., artificial intelligence platform) (not shown) which allows for selecting (or determining) a working mode of the EV 10 based on the information on the emergency situation. The machine learning system can be embodied based on at least one machine learning algorithm of an artificial neural network (ANN), recurrent neural network (RNN) including long short-term memory (LSTM) (i.e., a LSTM network), a support vector machine, a decision tree, a deep learning, a sparse network of winnows (SNoW), a K-nearest neighbor, a Naïve Bayes, or the like, or any combination thereof.

For example, if a police officer is stopped on the side of the road and places our control system in a state that is signaling motorists to the left of the vehicle, a officer initiated geofence is created. Further, the system can increase the degree of geo fence when the driver side door is opened and the driver seat sensor is signaling vacant. The geo fence severity therefore is signal the physical obstacle of the parked EV AND that an Officer is outside the vehicle and presumably in the road or on the roadside.

Referring back to FIGS. 5 and 7, examples of the intents 1420_1 to 1420_N may include, but are not limited: chasing or pursuing of criminal(s), emergency responding to the scene, safety actions for other stopping vehicles, pulling over vehicles, or the like if the EV 10 is a police car; emergency responding to the scene, transferring patients toward a hospital, or the like if the EV 10 is an ambulance; emergency responding to the scene, extinguishing fire, rescuing people or the like if the EV 10 is a fire truck or a rescue vehicle; roadside removal or assistance of a disabled vehicle in the case of a tow truck or motorist aid vehicle.

Figure 8B:
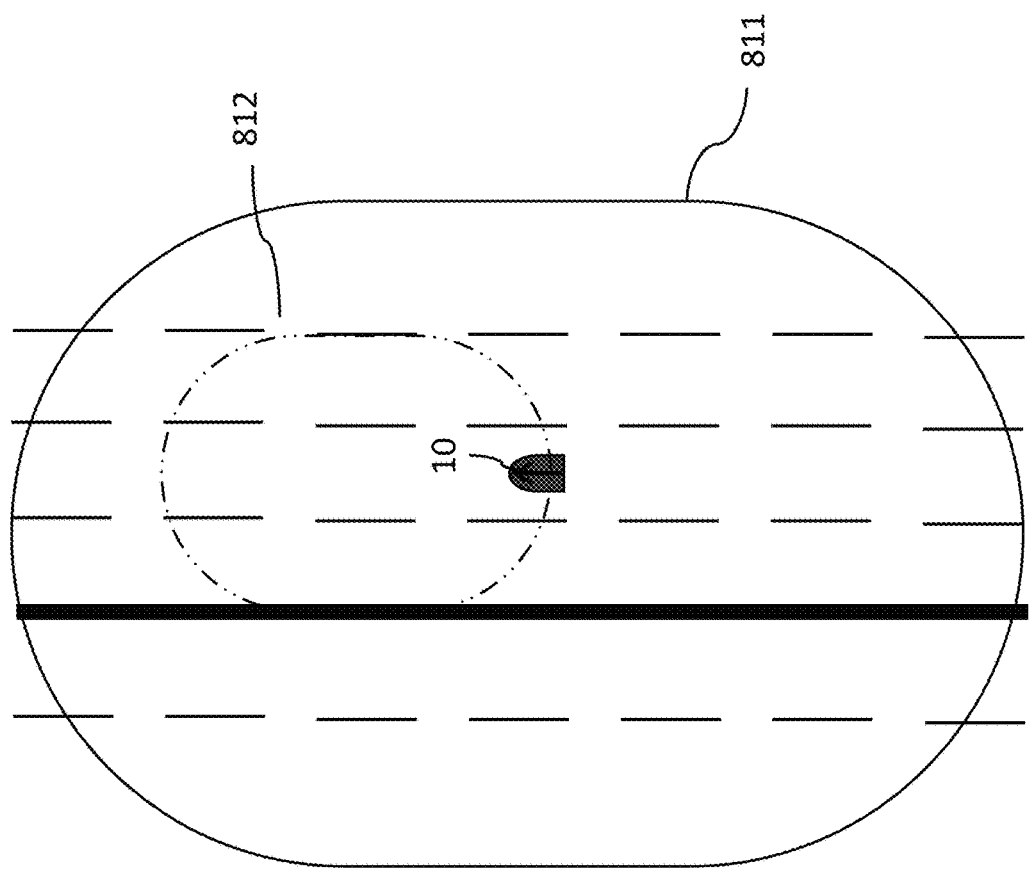
FIGS. 8B to 8E depict example geofences for the EV depending on intents thereof according to an exemplary embodiment of the present application.

FIG. 8A depicts example classifications of the intents depending on a moving status of the EV according to an exemplary embodiment of the present application. FIGS. 8B to 8E depict example geofences for the EV depending on the intents thereof according to an exemplary embodiment of the present application.

By way of example only, the intents can be classified into two groups (e.g., mobile or immobile) depending on a moving status of the EV 10, as depicted in FIG. 8A. For example, the intents such as chasing or pursuing of criminals 8010, emergency responding 8020, transferring patients 8030, or the like may be classified into a mobile group where the EV 10 moves along the road, and the intents such as safety actions for stopped vehicles 8060, extinguishing fire 8070, rescuing operations 8080, or the like may be classified into an immobile group where the EV 10 is stationary.

Referring now to FIG. 8B, in an example scenario (e.g., associated with intent 8010) where the EV 10 such as a police car chases a vehicle driven by criminals, all sorts of vehicles including the police car, the vehicle driven by criminals and other vehicles traveling therearound are at high risk for being involving in car accidents, gun violence, or the like, if the criminals possess firearms or bombs in their vehicle. Thus, to address this particular situation, the geofence 811 can be extended to cover as broad an area as possible which allows for providing an alert to as many vehicles or people as possible, so that the other vehicles can stay away from the scene. In an example, the geofence 811 may be broadened up to the opposing lanes.

Referring further to FIG. 8B, in another example scenario where an EV 10 such as a police car, a firetruck and an ambulance head to an emergency scene, the geofence 812 can be generated to cover a front direction of the EV 10 rather than a rear direction thereof and the size of the geofence 812 can be smaller than that of the geofence 811.

Figure 8C:
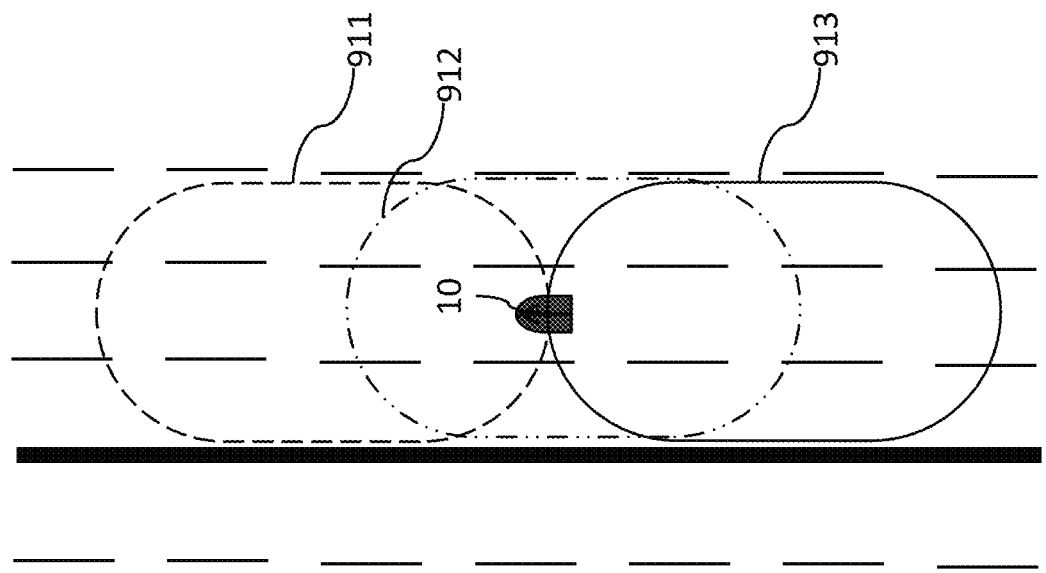
Figure 8E:
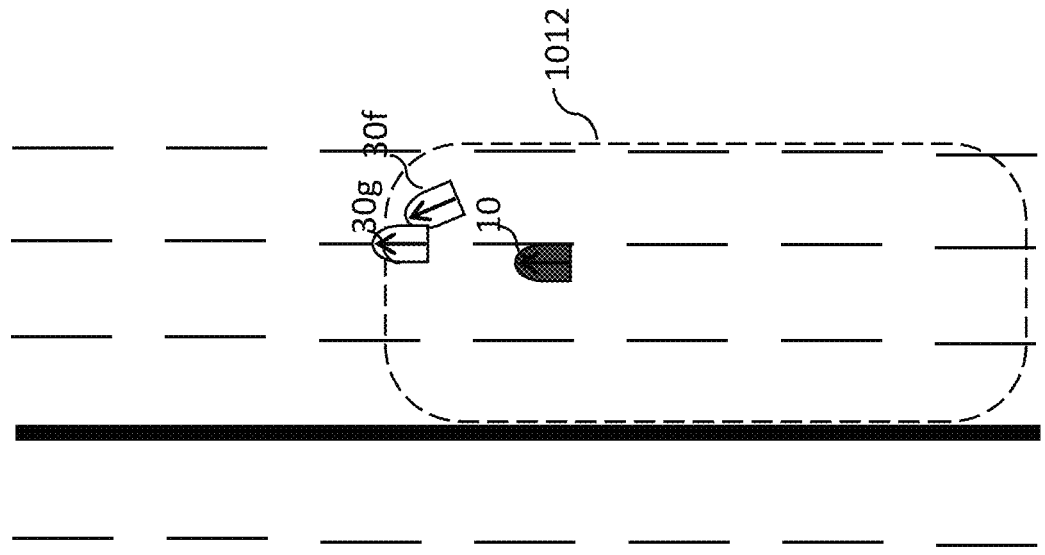

Referring now to FIG. 8C, the area covered by the geofence can vary depending on a relative velocity of the EV 10 with respect to velocities (e.g., average velocity) of the other vehicles traveling around. The remote management server 20 may collect velocity information of the other vehicles traveling within a predetermined distance far from the EV 10 and determine an average velocity thereof, and use the average velocity to determine the size or shape of the geofence of the EV 10.

For example, if the velocity of the EV 10 is equal to the average velocity, or is equal to the average velocity within a predetermined margin, the geofence 911 may be generated to evenly cover both the front and rear directions of the EV 10. Further, if the velocity of the EV 10 is faster than the average velocity by more than the predetermined margin, the geofence 912 may be generated to cover the front direction of the EV 10. On the other hand, if the velocity of the EV 10 is slower than the average velocity by more than the predetermined margin, the geofence 913 may be generated to cover the rear direction of the EV 10.

Figure 8D:
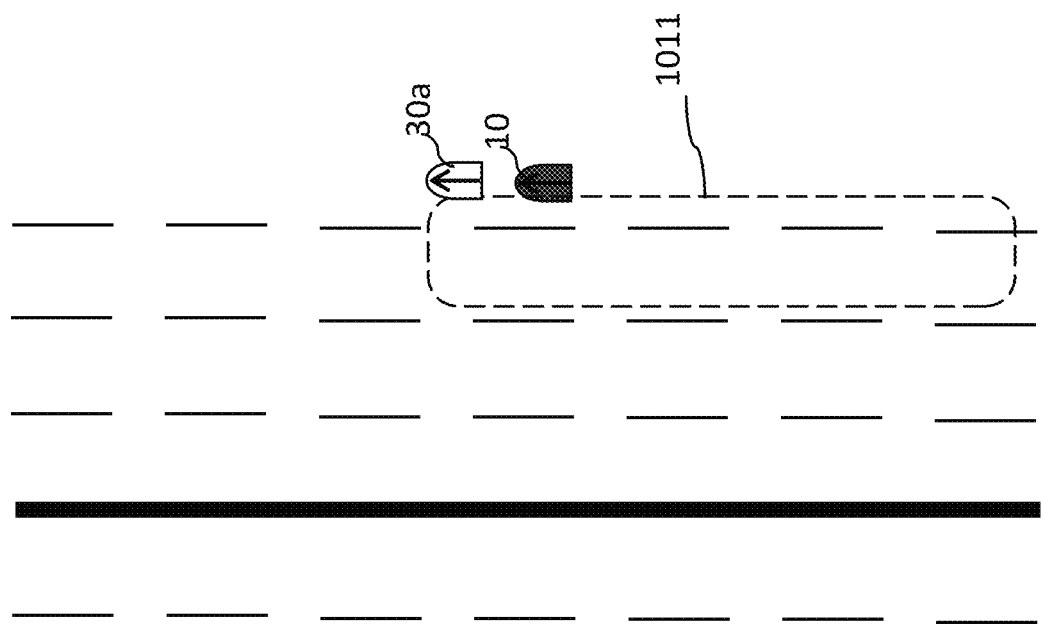

Referring to FIG. 8D, the EV 10 may be a police car which pulls over the vehicle 30a. In this case, the geofence 1011 may be generated to cover only one or two lanes near a shoulder where the vehicle 30a is pulled over. On the other hand, referring to FIG. 8E, the EV 10 can be a police car or fire truck conducting emergency response operations to an accident or natural disasters in which the whole lanes are blocked for safety. In this case, the geofence 1012 may be generated to cover the whole lanes. In both cases described with reference to FIGS. 8D and 8E, the geofences 1011 and 1012 both extend to more cover the rear direction of the EV 10 than the front direction thereof.

It is noted that emergency modes corresponding to some intents such as chasing or pursuing of a criminal, safety actions for other stopping vehicles, pulling over vehicles, or the like are only selected in the manual manner by a user selection input through the input device 140 since the emergency actions associated with these intents may begin with instant decisions or actions of the EV operator rather than, for example, using the information on the emergency situation.

Further, although it is illustrated in FIGS. 4A, 4B, 5, 6A, 6B and 7 that the working mode selection of the EV 10 is made at the EV 10, exemplary embodiments of the present disclosure are not limited thereto. For example, the working mode selection of the EV 10 can be made at the remote management server 20. In this case, as similar to the case where the working mode selection is made at the EV 10, for the manual selection mode the information on the emergency situation will be displayed on the output device 250 of the remote management server 20, and the working mode selection menu will be provided on the input device 240. In regard to the automatic selection mode, the processor 210 of the remote management server 20 (or a machine learning system thereof) determines a working mode based on the information on the emergency situation, as similar to the case where the working mode selection is made at the EV 10. For example, the memory 220 may store information on a mapping relationship (not shown) between the information of the emergency situation and a desired working mode in which the EV 10 is expected to work. The processor 210 may use the mapping relationship to determine the working mode based on the information of the emergency situation. Further, the processor 210 and the memory 220 may be implemented using a machine learning system (e.g., artificial intelligence platform) (not shown) which allows for selecting (or determining) a working mode of the EV 10 based on the information on the emergency situation. In addition, as the working mode is selected by the remote management server 20, the working mode selection signal 14 indicating the selected working mode might not be generated and transmitted from the EV 10 to the remote management server 20. Duplicate thereof will be omitted for the sake of description.

Embodiments Where Geofence is Generated and Transmitted by Emergency Vehicle

In this section will be described the embodiments where the geofence (e.g., 81) is generated and transmitted by the EV 10. It is noted that similar to or substantially the same descriptions as the embodiments where the geofence is generated and transmitted by the remote management server 20 can be applied except for what will be particularly described in this section. Duplicate thereof will be omitted for the sake of simplicity.

Referring to FIG. 2A, the emergency subscriber device 100 generates EV-related data 11 and stores the EV-related data 11 into the memory 120.

In one embodiment, safety warning signals generated by the processor 110 of the emergency subscriber device 100 and transmitted to the subscriber device 300 are substantially the same as or similar to the safety warning signals 500a or 500b described with reference to FIGS. 3A and 3B.

In addition, the memory 120 includes program instructions executable by the processor 110 to perform functions or operations of the emergency subscriber device 100 described in the present disclosure. The processor 110 reads the stored data which have been collected from the sensor devices 160 and processes to generate messages that will be transmitted to the subscriber device 300 through the transmitter 132 of the communication device 130.

In one embodiment, the geofence can dynamically be adjusted in size or shape according to a working mode of the EV 10. For example, when determining the geofence for the EV 10, the processor 110 of the emergency subscriber 100 dynamically changes the shape or size of the geofence based on the working mode of the EV 10. The working mode of the EV 10 can be selected (or determined) at the EV 10 or the remote management server 20.

In one embodiment, the working mode of the EV 10 can be selected (or determined) in a manual manner by a user selection input through an input device 140 of the emergency subscriber device 100, which will be described with reference to FIG. 8A.

Figure 9A:
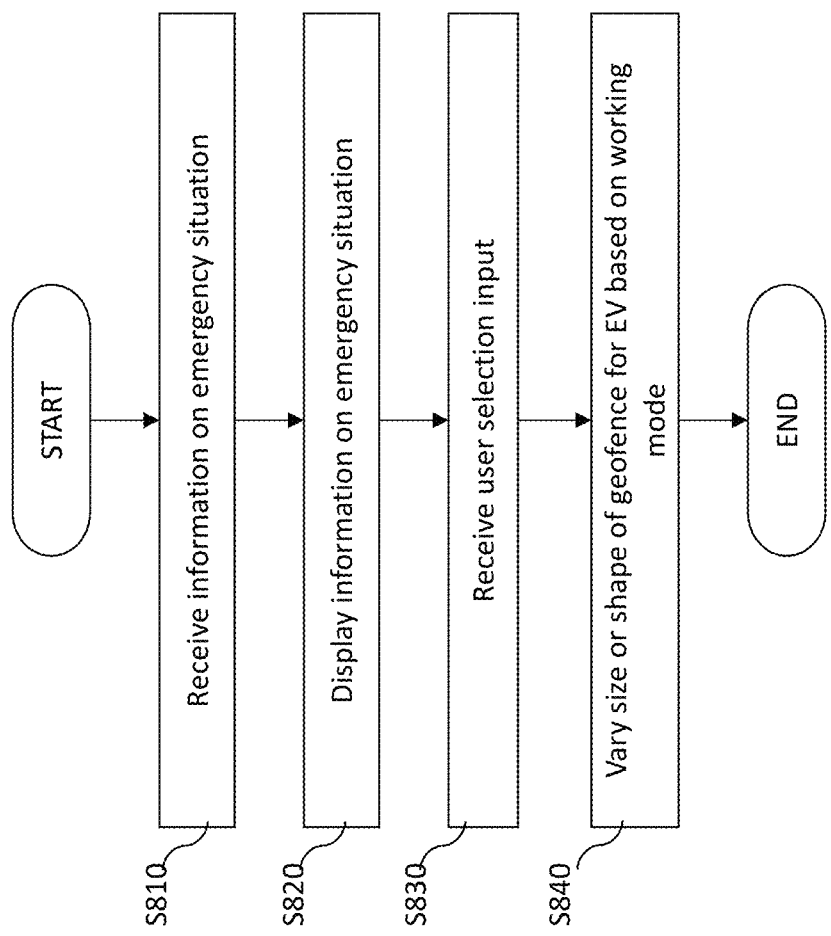
FIG. 9A depicts a flow chart of a method for selecting a working mode of an EV and varying a size or shape of a geofence based on the selected working mode according to an exemplary embodiment of the present disclosure.

FIG. 9A depicts a flow chart of a method for selecting a working mode of an EV and varying a size or shape of a geofence based on the selected working mode according to an exemplary embodiment of the present disclosure.

Referring to FIG. 9A, the working mode selection of the EV 10 is made in a manual manner by a user selection input through the input device 140 of the emergency subscriber device 100. In step S810, the emergency subscriber device 100 (e.g., processor 110) receives the information on the emergency situation from the remote management server 20 or other control systems which receive various information regarding emergency situations such as accidents, crimes, disasters, or the like. Next, the emergency subscriber device 100 may display an EV operator (e.g., driver) the information of the emergency situation using the output device 150 (e.g., display screen) (S820) and allow the EV operator to select (or input) one of emergency modes through the input device 140. Thus, the emergency subscriber device 100 receives a user selection input for the working mode of the EV 10 (S830). Next, the EV 10 (e.g., processor 110) varies a size or shape of a geofence for the EV 10 based on the selected working mode, when it determines the geofence (S840).

In one embodiment, the working mode of the EV 10 can be selected (or determined) in an automatic manner by the emergency subscriber 100 of the EV 10, which will be described with reference to FIG. 9B.

FIG. 9B depicts a flow chart of a method for selecting a working mode of an EV and varying a size or shape of a geofence based on the selected working mode according to an exemplary embodiment of the present disclosure.

Referring to FIG. 9B, the working mode selection of the EV 10 is made in an automatic manner by the emergency subscriber device 100 (e.g., the processor 110) based on the information on the emergency situation. In step S910, the processor 110 receives the information on the emergency situation from the remote management server 20 or other control systems which receive various information regarding emergency situations. Next, the processor 110 determines a working mode based on the information of the emergency situation (S920). Next, the emergency subscriber device 100 (e.g., processor 110) varies a size or shape of a geofence for the EV 10 based on the selected working mode, when it determines the geofence (S930).

Figure 10:
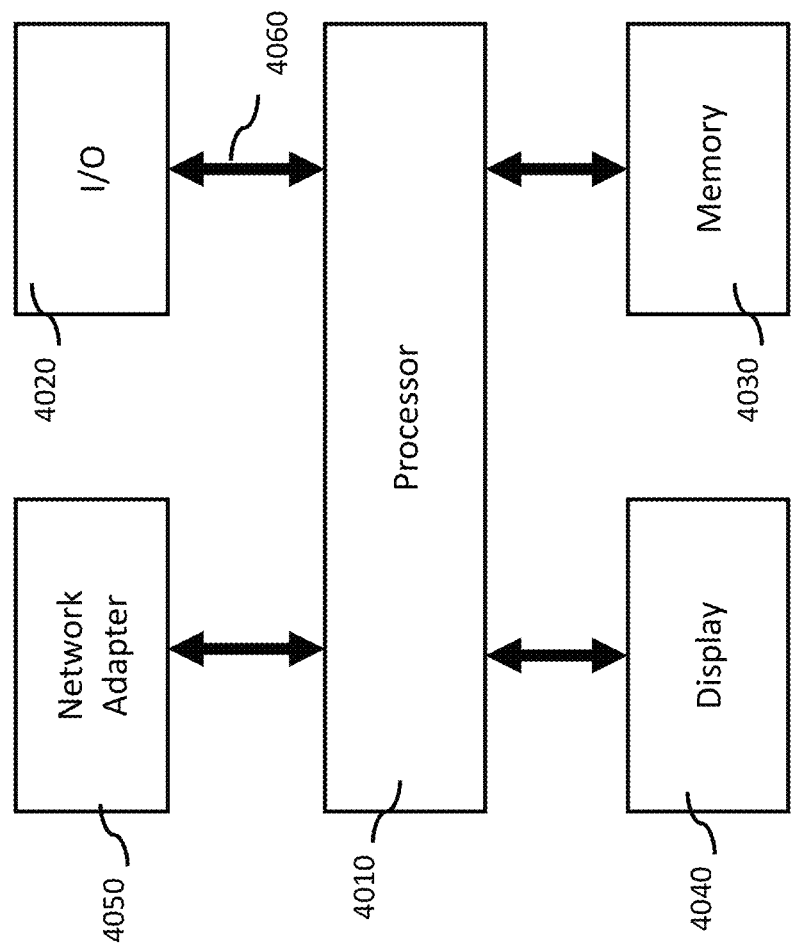
FIG. 10 is a block diagram of a computing system according to an embodiment of the present disclosure.

FIG. 10 is a block diagram of a computing system 4000 according to an exemplary embodiment of the present disclosure.

Referring to FIG. 10, the computing system 4000 may be used as a platform for performing: the functions or operations described hereinabove with respect to at least one of the emergency subscriber device 100, the remote management server 20 and the subscriber device 300; and the methods described with reference to FIGS. 2A-2C, 3A-3B, 4A-4B, 5, 8A-8E and 9A-9B.

Referring to FIG. 10, the computing system 4000 may include a processor 4010, I/O devices 4020, a memory system 4030, a display device 4040, and/or a network adaptor 4050.

The processor 4010 may drive the I/O devices 4020, the memory system 4030, the display device 4040, and/or the network adaptor 4050 through a bus 4060.

The computing system 4000 may include a program module for performing: the functions or operations described hereinabove with respect to at least one of the emergency subscriber device 100, the remote management server 20 and the subscriber device 300; and the methods described with reference to FIGS. 2A-2C, 3A-3B, 4A-4B, 5, 8A-8E and 9A-9B. For example, the program module may include routines, programs, objects, components, logic, data structures, or the like, for performing particular tasks or implement particular abstract data types. The processor (e.g., 4010) of the computing system 4000 may execute instructions written in the program module to perform: the functions or operations described hereinabove with respect to at least one of the emergency subscriber device 100, the remote management server 20 and the subscriber device 300; and the methods described with reference to FIGS. 2A-2C, 3A-3B, 4A-4B, 5, 8A-8E and 9A-9B. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) may communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth®, ZigBee®, or the like.

Exemplary embodiments of the present disclosure may include a system, a method, and/or a non-transitory computer readable storage medium. The non-transitory computer readable storage medium (e.g., the memory system 4030) has computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, system (or device), and computer program products (or computer readable medium). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A system for providing an emergency vehicle (EV) alert, comprising:
   a plurality of sensors configured to collect EV-related data, including data related to at least an operation status and an occupancy status of an EV;
   a processor configured to generate a geofence for the EV by varying a size or shape of the geofence depending on a working mode of the EV, a determined intent associated with the EV, and the EV-related data; and
   a transmitter configured to transmit the generated geofence,
   wherein the working mode includes a non-emergency normal mode and two or more emergency modes having different degrees of emergency from one another, and wherein the processor is configured to vary the size and shape of the geofence based on the degree of emergency when the working mode is one of the two or more emergency modes; and
   wherein the intent includes an emergency action or mission assigned to the EV and is determined based on whether the EV is mobile or immobile.

2. The system of claim 1, further comprising another vehicle, wherein another processor associated with the another vehicle is configured to:
   receive the geofence;
   determine a location of the another vehicle with respect to the geofence; and
   perform one or more alert actions based on the determined location of the another vehicle with respect to the received geofence.

3. The system of claim 1, wherein the processor is further configured to determine the working mode of the EV based on a selection input by an operator or program instructions stored in memory and executable by the processor, and
   wherein the program instructions, when executed by the processor, determine the working mode based on information on an emergency situation received over a communication network.

4. The system of claim 3, wherein the processor and the memory storing the program instructions are implemented using a machine learning system.

5. The system of claim 1, further comprising an input interface configured to:
   receive the selection input corresponding to one of the normal mode and the two or more emergency modes; and
   transmit the selection input to the processor.

6. The system of claim 5, wherein the input interface comprises one or more selection menus associated with the emergency modes.

7. The system of claim 1, wherein the processor is further configured to increase the size of the geofence when the working mode is changed from the normal mode to one of the two or more emergency modes.

8. The system of claim 1, wherein the processor is further configured to increase the size of the geofence when the working mode is changed from one of the two or more emergency modes having a first degree of emergency to another of the two or more emergency modes having a second degree of emergency higher than the first degree of emergency.

9. The system of claim 1, wherein the processor and the transmitter are in the vicinity of or included in the EV.

10. The system of claim 1, wherein the processor and the transmitter are in the vicinity of or included in a management server remotely located from the EV.

11. The system of claim 1, further comprising:
increasing, by the processor, the size of the geofence when the working mode is changed from one of the two or more emergency modes having a first degree of emergency to another of the two or more emergency modes having a second degree of emergency higher than the first degree of emergency.

12. The system of claim 1, wherein at least one of the plurality of sensors is a door sensor or a seat sensor.

13. A method for providing an emergency vehicle (EV) alert, comprising:
collecting, with a plurality of sensors, EV-related data including data related to at least an operation status and an occupancy status of an EV;
determining an intent associated with the EV, wherein the intent includes an emergency action or mission assigned to the EV and is based on whether the EV is mobile or immobile;
generating, by a processor, a geofence by varying a size or shape of the geofence depending on a working mode of an EV, the determined intent, and the EV-related data;
transmitting, by a transmitter, the generated geofence;
wherein the working mode includes a non-emergency normal mode and two or more emergency modes having different degrees of emergency from one another, and wherein the processor is configured to vary the size and shape of the geofence based on the degree of emergency when the working mode is one of the two or more emergency modes.

14. The method of claim 13, further comprising:
receiving, by another processor associated with another vehicle, the geofence;
determining, by the another processor, a location of the another vehicle with respect to the received geofence; and
performing, by the another processor, one or more alert actions based on the determined location of the another vehicle with respect to the received geofence.

15. The method of claim 13, further comprising:
determining the working mode of the EV based on a selection input by an operator or program instructions stored in memory and executable by the processor, wherein the program instructions, when executed by the processor, determine the working mode based on information on an emergency situation received over a communication network.

16. The method of claim 13, further comprising:
receiving the selection input corresponding to one of the normal mode and the two or more emergency modes using an input interface; and
transmitting the selection input to the processor.

17. The method of claim 13, further comprising:
increasing, by the processor, the size of the geofence when the working mode is changed from the normal mode to one of the emergency modes.

18. The method of claim 13, wherein at least one of the plurality of sensors is a door sensor or a seat sensor.

19. A non-transitory computer-readable storage medium having computer readable program instructions,
the computer readable program instructions read and executed by at least one processor for performing a method for providing an emergency vehicle (EV), comprising:
receiving, from a plurality of sensors, EV-related data including date related to at least an operation status and an occupancy status of the EV;
generating a geofence by varying a size or shape of the geofence depending on a working mode of the EV, a determined intent associated with the EV, and the EV-related data; and
transmitting the generated geofence;
wherein the working mode includes a non-emergency normal mode and two or more emergency modes having different degrees of emergency from one another, and wherein the processor is configured to vary the size and shape of the geofence based on the degree of emergency when the working mode is one of the two or more emergency modes;
and wherein the intent includes an emergency action or mission assigned to the EV and is determined based on whether the EV is mobile or immobile.

20. The storage medium of claim 19, wherein the method further comprises:
receiving the selection input corresponding to one of the normal mode and the two or more emergency modes using an input interface; and
transmitting the selection input to the at least one processor.

21. The storage medium of claim 19, wherein the method further comprises:
increasing the size of the geofence when the working mode is changed from the normal mode to one of the two or more emergency modes.

22. The storage medium of claim 19, wherein the method further comprises:
increasing the size of the geofence when the working mode is changed from one of the two or more emergency modes having a first degree of emergency to another of the two or more emergency modes having a second degree of emergency higher than the first degree of emergency.

23. The storage medium of claim 19, wherein the EV-related data received from a plurality of sensors includes data received from a door sensor or seat sensor.

* * * * *